US012613779B2

(12) United States Patent
Song

(10) Patent No.: US 12,613,779 B2
(45) Date of Patent: Apr. 28, 2026

(54) SEMICONDUCTOR SYSTEM

(71) Applicant: SK hynix Inc., Icheon-si (KR)

(72) Inventor: Choung Ki Song, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 18/958,861

(22) Filed: Nov. 25, 2024

(65) Prior Publication Data

US 2026/0050520 A1     Feb. 19, 2026

(30) Foreign Application Priority Data

Aug. 16, 2024     (KR) ........................ 10-2024-0110097

(51) Int. Cl.
*G06F 11/00*          (2006.01)
*G06F 11/14*          (2006.01)

(52) U.S. Cl.
CPC ........ *G06F 11/1423* (2013.01); *G06F 11/141* (2013.01); *G06F 11/142* (2013.01)

(58) Field of Classification Search
CPC ... G06F 11/142; G06F 11/141; G06F 11/1423
See application file for complete search history.

(56) References Cited

U.S. PATENT DOCUMENTS

| | | | | | |
|---|---|---|---|---|---|
| 6,388,920 | B2 * | 5/2002 | Katayama | .............. | G11C 29/88 |
| | | | | | 365/185.11 |
| 8,773,939 | B2 * | 7/2014 | Oh | ........................... | G11C 8/12 |
| | | | | | 365/230.03 |
| 10,678,631 | B2 * | 6/2020 | Shin | .................... | G06F 11/1423 |
| 10,740,244 | B2 * | 8/2020 | Chang | ................... | G06F 11/142 |
| 11,074,947 | B2 * | 7/2021 | Ajima | .................. | G11C 29/886 |
| 11,651,831 | B2 * | 5/2023 | Lim | ....................... | G11C 29/76 |
| | | | | | 714/718 |
| 12,216,543 | B2 * | 2/2025 | Wright | ................ | G06F 13/4068 |
| 2013/0292840 | A1 * | 11/2013 | Shoemaker | ......... | H01L 25/0652 |
| | | | | | 257/773 |
| 2015/0206573 | A1 * | 7/2015 | Ryu | ....................... | G11C 29/26 |
| | | | | | 365/191 |

(Continued)

FOREIGN PATENT DOCUMENTS

KR       1020220159088  A     12/2022

*Primary Examiner* — Jonathan D Gibson
(74) *Attorney, Agent, or Firm* — WILLIAM PARK AND ASSOCIATES LTD.

(57) ABSTRACT

A semiconductor system includes a system chip including a plurality of system interfaces, configured to output a plurality of requests as a plurality of transfer requests through the plurality of system interfaces, and configured to output the plurality of requests as the plurality of transfer requests by bypassing a system interface in which a fail occurred among the plurality of system interfaces, an interposer configured to output the plurality of transfer requests as a plurality of input requests through a plurality of wires, and a base chip including a plurality of high bandwidth memory (HBM) interfaces and configured to control operation of a stack memory device in response to receiving the plurality of input requests from the plurality of HBM interfaces and configured to receive the plurality of input requests by bypassing an HBM interface in which a fail occurred among the plurality of HBM interfaces.

27 Claims, 20 Drawing Sheets

(56)          References Cited

U.S. PATENT DOCUMENTS

| | | | |
|---|---|---|---|
| 2015/0363258 A1* | 12/2015 | Shin | G06F 11/0703 |
| | | | 714/3 |
| 2016/0034371 A1* | 2/2016 | Oh | G06F 3/0688 |
| | | | 714/6.2 |
| 2017/0091040 A1* | 3/2017 | Wright | G06F 3/0617 |
| 2018/0341552 A1* | 11/2018 | Liikanen | G11C 11/5628 |
| 2020/0176072 A1* | 6/2020 | Nale | G11C 29/76 |
| 2020/0335143 A1* | 10/2020 | Ajima | G11C 5/04 |
| 2022/0342595 A1* | 10/2022 | Chatterjee | G06F 3/0604 |
| 2023/0359526 A1* | 11/2023 | Wright | G06F 3/0659 |
| 2024/0079074 A1* | 3/2024 | Bak | G11C 29/52 |

* cited by examiner

TREQ1 → [201] → IREQ1

TREQ2 → [202] → IREQ2

. . .

TREQ32 → [232] → IREQ32

Figure 14:
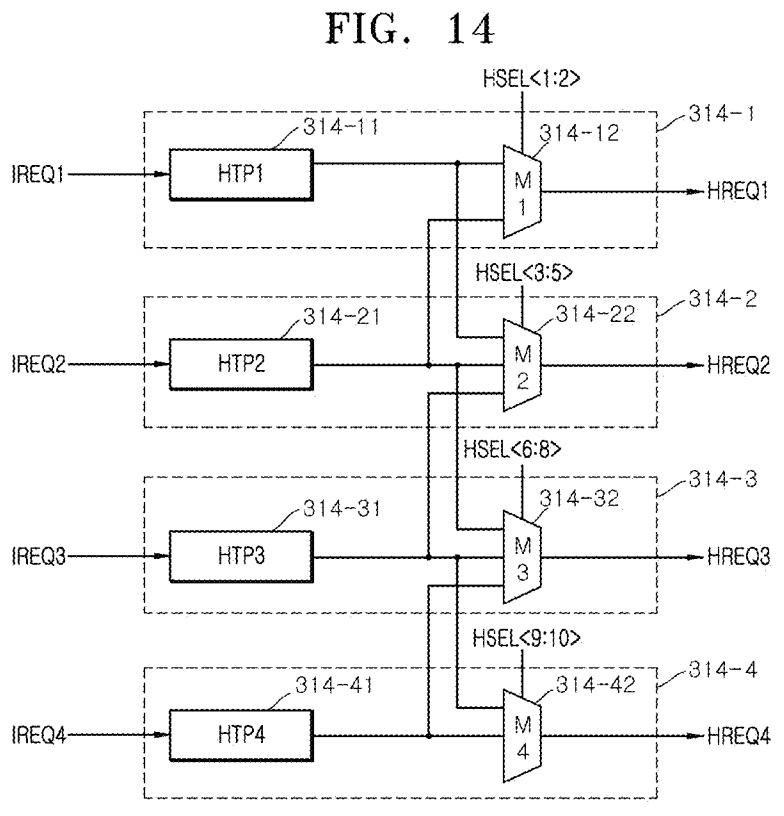

IREQ1 → HTP1 (314-11) → M 1 (314-12) → HREQ1    314-1
HSEL<1:2>

IREQ2 → HTP2 (314-21) → M 2 (314-22) → HREQ2    314-2
HSEL<3:5>

IREQ3 → HTP3 (314-31) → M 3 (314-32) → HREQ3    314-3
HSEL<6:8>

IREQ4 → HTP4 (314-41) → M 4 (314-42) → HREQ4    314-4
HSEL<9:10>

SEMICONDUCTOR SYSTEM

CROSS-REFERENCE TO RELATED APPLICATION

The present application claims priority under 35 U.S.C. § 119(a) to Korean Patent Application No. 10-2024-0110097, filed in the Korean Intellectual Property Office on Aug. 16, 2024, the entire contents of which application is incorporated herein by reference.

BACKGROUND

1. Technical Field

The present disclosure relates to a semiconductor system, including but not limited to a semiconductor system including high bandwidth memory.

2. Related Art

As technology for manufacturing semiconductor devices is developed, packaging technology for core chips within the semiconductor device is increasingly achieving higher integration and higher performance. As packaging technologies for semiconductor devices are developed, technology relating to three-dimensional structures in which core chips are vertically stacked gradually varies from technology relating to two-dimensional structures in which a plurality of core chips is disposed in a flat layout on a printed circuit board (PCB). Semiconductor devices having three-dimensional structures are implemented by stacking a plurality of core chips using at least one through silicon via (TSV) referred to as a "through electrode", or by stacking a plurality of core chips and utilizing wire bonding, such as utilized in high bandwidth memory (HBM).

SUMMARY

In an embodiment, a semiconductor system may include a system chip including a plurality of system interfaces and configured to output a plurality of requests as plurality of transfer requests through the plurality of system interfaces and configured to output the plurality of requests as the plurality of transfer requests by bypassing a system interface in which a fail occurred among the plurality of system interfaces, an interposer including a plurality of wires and configured to output the plurality of transfer requests as a plurality of input requests through the plurality of wires, and a base chip including a plurality of HBM interfaces and configured to control operation of a stack memory device in response to receiving the plurality of input requests from the plurality of HBM interfaces and configured to receive the plurality of input requests by bypassing an HBM interface in which a fail occurred among the plurality of HBM interfaces.

In an embodiment, a semiconductor system may include a system chip including a first system interface, a second system interface, a third system interface, and a fourth system interface and configured to output, when a fail occurs in the fourth system interface, a first request, a second request, a third request, and a fourth request as a first transfer request, a second transfer request, a third transfer request, and a fourth transfer request through the first system interface, the second system interface, and the third system interface, wherein the first system interface and the second system interface are adjacent to the fourth system interface, an interposer including a plurality of wires and configured to output the first transfer request, the second transfer request, the third transfer request, and the fourth transfer request as a first input request, a second input request, a third input request, and a fourth input request through the plurality of wires, and a base chip including a first to fourth HBM interfaces and configured to receive, when a fail occurs in the fourth HBM interface, the first input request, the second input request, the third input request, and the fourth input request from the first HBM interface, the second HBM interface, and the third HBM interface, wherein the first HBM interface and the second HBM interface are adjacent to the fourth HBM interface.

In an embodiment, a semiconductor system may include a system chip including a first system interface, a second system interface, a third system interface, and a fourth system interface and configured to output a first request, a second request, a third request, and a fourth request as a first transfer request, a second transfer request, a third transfer request, and a fourth transfer request through the first system interface, the second system interface, the third system interface, and the fourth system interface, configured to split the first request, the second request, the third request, and the fourth request through a system interface in which a fail has not occurred by bypassing a system interface in which a fail occurred among the first system interface, the second system interface, the third system interface, and the fourth system interface, and configured to output a split first request, a split second request, a split third request, and a split fourth request as the first transfer request, the second transfer request, the third transfer request, and the fourth transfer request, an interposer including a plurality of wires and configured to output the first transfer request, the second transfer request, the third transfer request, and the fourth transfer request as a first input request, a second input request, a third input request, and a fourth input request through the plurality of wires, and a base chip including a first HBM interface, a second HBM interface, a third HBM interface, and a fourth HBM interface and configured to receive the first input request, the second input request, the third input request, and the fourth input request from the first HBM interface, the second HBM interface, the third HBM interface, and the fourth HBM interface, configured to receive the first input request, the second input request, the third input request, and the fourth input request from an HBM interface in which a fail has not occurred by bypassing an HBM interface in which a fail occurred, among the first HBM interface, the second HBM interface, the third HBM interface, and the fourth HBM interface, and configured to transmit the first input request, the second input request, the third input request, and the fourth input request to a plurality of channels of a stack memory device by splitting the first input request, the second input request, the third input request, and the fourth input request.

BRIEF DESCRIPTION OF THE DRAWINGS

FIG. 1 is a block diagram illustrating a construction of a semiconductor system according to an embodiment of the present disclosure.

FIG. 4 is a diagram illustrating an embodiment of an interposer included in a semiconductor system according to the present disclosure.

FIG. 5 is a block diagram illustrating an embodiment of an HBM interface circuit that is included in a base chip according to the present disclosure.

FIG. 8 is a block diagram illustrating an embodiment of a first core chip of a stack memory device according to the present disclosure.

FIG. 9 and FIG. 10 are diagram of a semiconductor system according to an embodiment of the present disclosure.

FIG. 13 is a block diagram illustrating an embodiment of an HBM interface circuit included in the base chip according to the present disclosure.

FIG. 14 is a block diagram illustrating an embodiment of memory request generation circuits included in an HBM interface circuit according to the present disclosure.

FIG. 15 and FIG. 16 are diagrams illustrating a semiconductor system according to an embodiment of the present disclosure.

FIG. 18 is a diagram of the semiconductor system according to an embodiment of the present disclosure.

DETAILED DESCRIPTION

Figure 2:
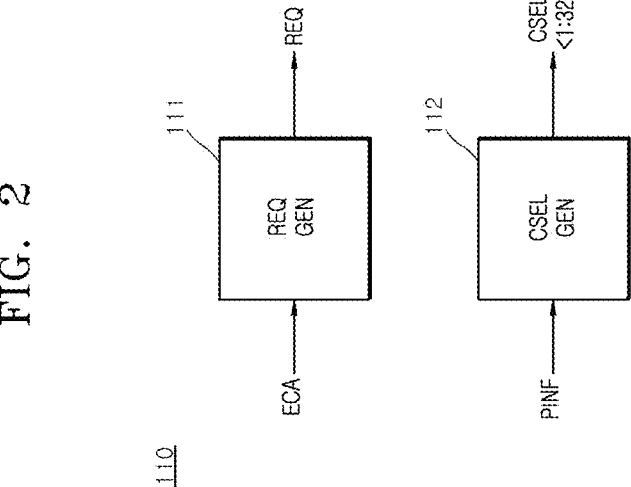
FIG. 2 is a block diagram illustrating an embodiment of a processor included in a system chip illustrated according to the present disclosure.

Terms such as "vertical," "over," "on," and other terms implying relative spatial relationship or orientation are utilized only for the purpose of ease of description or reference to a drawing and are not otherwise limiting.

Terms such as "first" and "second" are used to distinguish between various components and do not imply size, order, priority, quantity, or importance of the components. For example, a first component may be referred to as a second component in one example, and the second element may be referred to as a first element in another example.

When one component is identified as "connected" to another component, the components may be connected directly or through an intervening component between the components. When two components are identified as "directly connected," one component is directly connected to the other component without an intervening component between the two components.

A "logic high level" and a "logic low level" describe the logic levels of signals. A signal at a "logic high level" is distinguished from a signal at a "logic low level." For example, when a signal at a first voltage corresponds to a signal at a "logic high level," a signal at a second voltage corresponds to a signal at a "logic low level." According to an embodiment, a "logic high level" is at a voltage higher than a voltage for a "logic low level." According to an embodiment, the logic levels of signals may be different logic levels or opposite logic levels. For example, a signal at a logic high level may be at a logic low level in some embodiments, and a signal at a logic low level may be at a logic high level in other embodiments.

Embodiments of the present disclosure are described in detail with reference to the accompanying drawings. Specific structural or functional descriptions of embodiments are provided as examples to describe concepts that are disclosed in the present application. Examples or embodiments in accordance with the concepts may be carried out in various forms, and the scope of the present disclosure is not limited to the examples or embodiments described in this specification.

Figure 1:
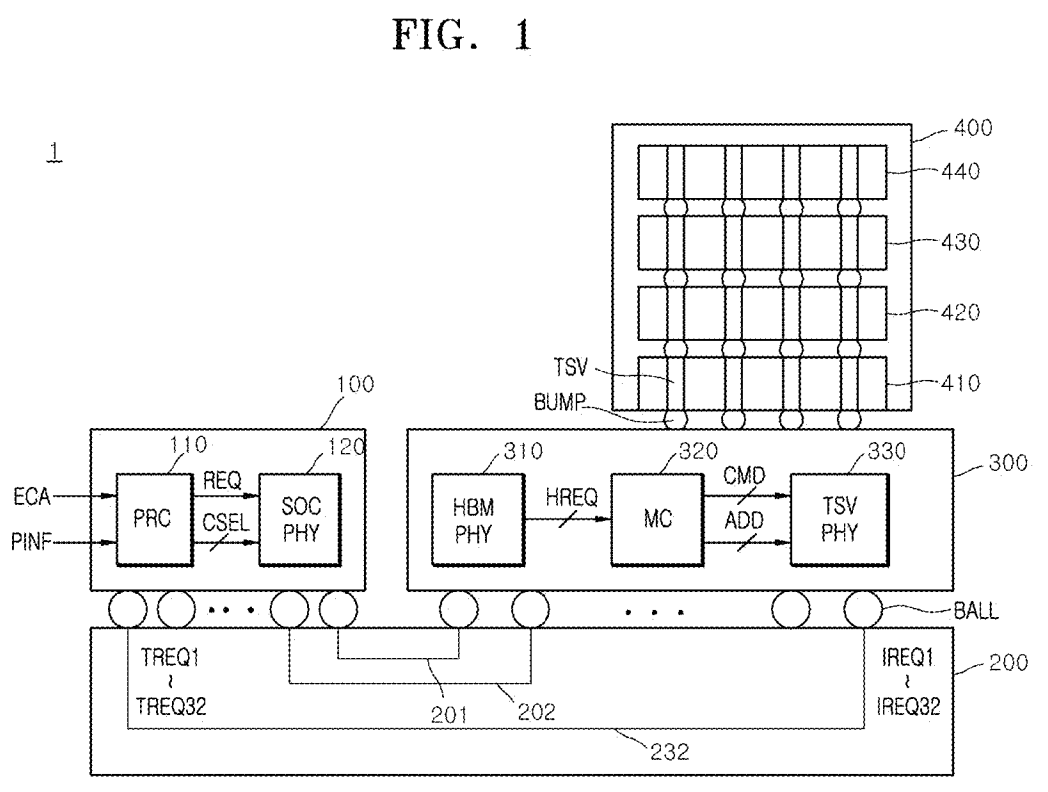

As illustrated in FIG. 1, a semiconductor system 1 according to an embodiment of the present disclosure includes a system chip 100, an interposer 200, a base chip 300, and a stack memory device 400.

The system chip 100 includes a processor PRC 110 and a system interface circuit SOC PHY 120.

The system chip 100 is stacked on or over the interposer 200 through a plurality of balls BALL.

The processor 110 generates a request REQ based on an external signal ECA input from outside of the semiconductor system 1. The external signal ECA and the request REQ are signals including a command and an address that control operations of the stack memory device 400, such as an active operation, a write operation, a read operation, and a precharge operation. The external signal ECA may be input from a device, including one or more of various devices, such as a host and a test device, located outside the semiconductor system 1.

Based on a fail information signal PINF, the processor 110 generates a plurality of channel selection signals CSEL that controls the input of a system interface in which a fail occurred among a plurality of system interfaces. The fail information signal PINF is a signal including information associated with a system interface in which a fail occurred among a plurality of system interfaces. The fail information signal PINF may be input from a device, including one or more of various devices, such as IEEE1500 and a test device located outside the semiconductor system 1. IEEE1500 may be implemented with a device that performs various tests for a stack memory device implemented by stacking a plurality of core chips using TSVs.

Figure 3:
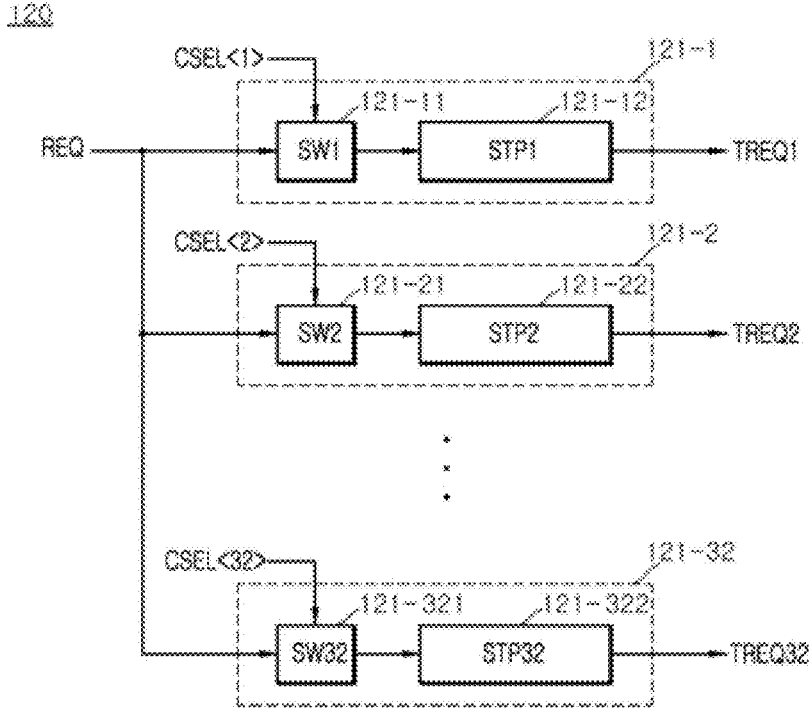
FIG. 3 is a block diagram illustrating an embodiment of a system interface circuit included in a system chip according to the present disclosure.

The system interface circuit 120 includes a plurality of system interfaces STP1 121-12 to STP32 121-322 in FIG. 3. Based on the plurality of channel selection signals CSEL, the system interface circuit 120 blocks the input of a system interface in which a fail occurred among the plurality of system interfaces 121-12 to 121-322 in FIG. 3. The system interface circuit 120 outputs the request REQ as transfer requests TREQ1 to TREQ32 through the plurality of system interfaces 121-12 to 121-322 in FIG. 3. The system interface circuit 120 outputs the request REQ as the transfer requests TREQ1 to TREQ32 by bypassing a system interface in which a fail occurred among the plurality of system interfaces 121-12 to 121-322 in FIG. 3.

The system chip 100 includes the plurality of system interfaces 121-12 to 121-322. The system chip 100 outputs the request REQ as the transfer requests TREQ1 to TREQ32 through the plurality of system interfaces 121-12 to 121-322. The system chip 100 outputs the requests REQ as the transfer requests TREQ1 to TREQ32 by bypassing a system interface in which a fail occurred among the plurality of system interfaces 121-12 to 121-322. The system chip 100 may output the requests REQ as the transfer requests TREQ1 to TREQ32 through a system interface that is adjacent to a system interface in which a fail occurred among the plurality of system interfaces 121-12 to 121-322 in FIG. 3.

The interposer 200 include a plurality of wires or electrical conductors 201 to 232. The interposer 200 outputs the transfer requests TREQ1 to TREQ32 as input requests IREQ1 to IREQ32 through the plurality of wires 201 to 232. Because the pitch of the balls of the system chip 100 is different from the pitch of the balls of the memory control chip 300, the interposer 200 electrically connects the system chip 100 and the base chip 300 using the plurality of wires 201 to 232. The interposer 200 is disposed under the system chip 100 and the base chip 300 may electrically connect the system chip 100 and the base chip 300 in this example.

The base chip 300 includes an HBM interface circuit HBM PHY 310, a memory controller MC 320, and a TSV interface circuit TSV PHY 330.

The base chip 300 is stacked on or over the interposer 200 through a plurality of balls.

The HBM interface circuit 310 includes a plurality of HBM interfaces. The HBM interface circuit 310 receives the input requests IREQ1 to IREQ32 through the plurality of HBM interfaces. Based on the input requests IREQ1 to IREQ32, the HBM interface circuit 310 blocks the input of an HBM interface in which a fail occurred among the plurality of HBM interfaces. The HBM interface circuit 310 receives the input requests IREQ1 to IREQ32 by bypassing an HBM interface in which a fail occurred among the plurality of HBM interfaces. The HBM interface circuit 310 outputs the input requests IREQ1 to IREQ32 as a plurality of memory requests HREQ by bypassing an HBM interface in which a fail occurred among the plurality of HBM interfaces.

Based on the plurality of memory requests HREQ the memory controller 320 generates a plurality of commands CMD and a plurality of addresses ADD that control operation of the stack memory device 400. The memory controller 320 outputs the plurality of commands CMD and the plurality of addresses ADD to the stack memory device 400 through the TSV interface circuit 330.

The TSV interface circuit 330 electrically connects the base chip 300 and the stack memory device 400 using through electrodes TSV. The TSV interface circuit 330 outputs the plurality of commands CMD and the plurality of addresses ADD to the stack memory device 400.

The base chip 300 includes the plurality of HBM interfaces. The base chip 300 receives the input requests IREQ1 to IREQ32 through the plurality of HBM interfaces. The base chip 300 receives the input requests IREQ1 to IREQ32 by bypassing an HBM interface in which a fail occurred among the plurality of HBM interfaces. The base chip 300 may receive the input requests IREQ1 to IREQ32 through an HBM interface adjacent to an HBM interface in which a fail occurred among the plurality of HBM interfaces. The base chip 300 outputs the input requests IREQ1 to IREQ32 as the plurality of memory requests HREQ through the plurality of HBM interfaces. The base chip 300 controls operation of the stack memory device 400 in response to receiving the input requests IREQ1 to IREQ32 through the plurality of HBM interfaces.

The stack memory device 400 includes a first core chip 410, a second core chip 420, a third core chip 430, and a fourth core chip 440.

Figure 7:
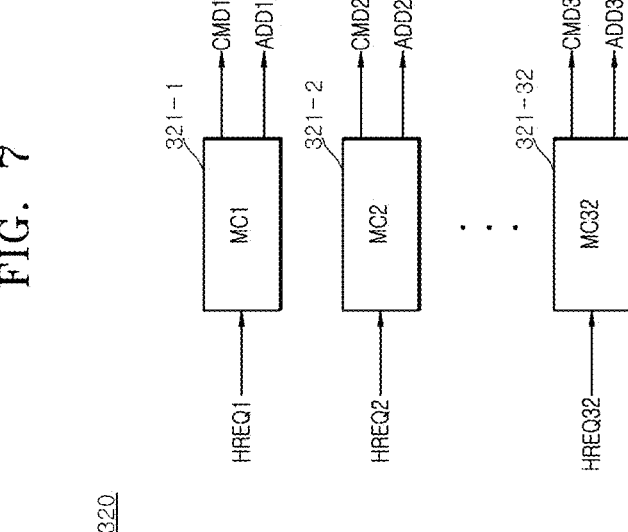
FIG. 7 is a block diagram illustrating an embodiment of a memory controller included in a base chip according to the present disclosure.

The first core chip 410 is stacked on or over the base chip 300. A plurality of bumps BUMP are disposed between and electrically connect the first core chip 410 and the base chip 300. The first core chip 410 includes through electrodes TSV electrically connected to the bumps BUMP. The first core chip 410 receives a plurality of commands CMD1 to CMD8 and a plurality of addresses ADD1 to ADD8, such as shown in FIG. 7, from the base chip 300 through the bumps BUMP and the through electrodes TSV. The first core chip 410 perform operations, such as an active operation, a write operation, a read operation, and a precharge operation, based on the plurality of commands CMD1 to CMD8 and the plurality of addresses ADD1 to ADD8. The first core chip 410 may be implemented with a device that stores and outputs data.

The second core chip 420 is stacked on or over the first core chip 410. A plurality of bumps BUMP are disposed between and electrically connect the first core chip 410 and the second core chip 420. The second core chip 420 includes through electrodes TSV electrically connected to the bumps BUMP. The second core chip 420 receives a plurality of commands CMD9 to CMD16 and a plurality of addresses ADD9 to ADD16, such as shown in FIG. 7, which are output by the base chip 300 through the bumps BUMP and through electrodes TSV of the first core chip 410. The second core chip 420 performs operations, such as an active operation, a write operation, a read operation, and a precharge operation, based on the plurality of commands CMD9 to CMD16 and the plurality of addresses ADD9 to ADD16. The second core chip 420 may be implemented with a device that stores and outputs data.

The third core chip 430 is stacked on or over the second core chip 420. A plurality of bumps BUMP are disposed between and electrically connect the third core chip 430 and the second core chip 420. The third core chip 430 includes through electrodes TSV electrically connected to the bumps BUMP. The third core chip 430 receives a plurality of commands CMD17 to CMD24 and a plurality of addresses ADD17 to ADD24, such as shown in FIG. 7, which are output by the base chip 300 through the bumps BUMP and through electrodes TSV of the second core chip 420. The third core chip 430 performs operations, such as an active operation, a write operation, a read operation, and a precharge operation, based on the plurality of commands CMD17 to CMD24 and the plurality of addresses ADD17 to ADD24. The third core chip 430 may be implemented with a device that stores and outputs data.

The fourth core chip 440 is stacked on or over the third core chip 430. A plurality of bumps BUMP are disposed between and electrically connect the third core chip 430 and the fourth core chip 440. The fourth core chip 440 includes through electrodes TSV electrically connected to the bumps BUMP. The fourth core chip 440 receive a plurality of commands CMD25 to CMD32 and a plurality of addresses ADD25 to ADD32, such as shown in FIG. 7, which are output by the base chip 300 through the bumps BUMP and through electrodes TSV of the third core chip 430. The fourth core chip 440 performs operations, such as an active operation, a write operation, a read operation, and a precharge operation, based on the plurality of commands CMD25 to CMD32 and the plurality of addresses ADD25 to ADD32. The fourth core chip 440 may be implemented with a device that stores and outputs data.

The semiconductor system 1, according to an embodiment of the present disclosure, transmits a request, to the stack memory device, that controls operation of the stack memory device 400 by bypassing an interface in which a fail occurred among a plurality of interfaces. The semiconductor system 1 can prevent errors during operation of the stack memory device 400 by transmitting a request to the stack memory device 400 by bypassing an interface in which a fail occurred among the plurality of interfaces. The semiconductor system 1 can prevent fail processing of the stack memory device 400 by transmitting a request to the stack memory device 400 by bypassing an interface in which a fail occurred among the plurality of interfaces.

FIG. 2 is a block diagram illustrating an embodiment of the processor 110, for example, as included in the system chip 100 illustrated in FIG. 1. The processor 110 includes a request generation circuit REQ GEN 111 and a channel selection signal generation circuit CSEL GEN 112.

The request generation circuit 111 generates the requests REQ based on the external signal ECA input from outside of the semiconductor system 1. Although the external signal ECA and the requests REQ are illustrated as one signal, the external signal ECA and the requests REQ may include a plurality of bits including a command and an address that control operations of the stack memory device 400, such as an active operation, a write operation, a read operation, and a precharge operation.

Based on the fail information signal PINF, the channel selection signal generation circuit 112 generates a first to thirty-second channel selection signal CSEL<1:32> that controls the input of a system interface in which a fail occurred among the plurality of system interfaces. An example in which the channel selection signal generation circuit 112 generates the first channel selection signal CSEL<1> at a logic low level based on the fail information signal PINF is an example in which a fail occurs in the first system interface 121-12 in FIG. 3. An example in which the channel selection signal generation circuit 112 generates the second channel selection signal CSEL<2> at a logic low level based on the fail information signal PINF is an example in which a fail occurs in the second system interface 121-22 in FIG. 3. Although the fail information signal PINF is illustrated as one signal, the fail information signal PINF may be a signal including a plurality of bits.

FIG. 3 is a block diagram illustrating an embodiment of the system interface circuit 120, for example, as included in the system chip 100 illustrated in FIG. 1. A system interface circuit 120 includes a first transfer request generation circuit 121-1 to a thirty-second transfer request generation circuit 121-32.

Figure 8:
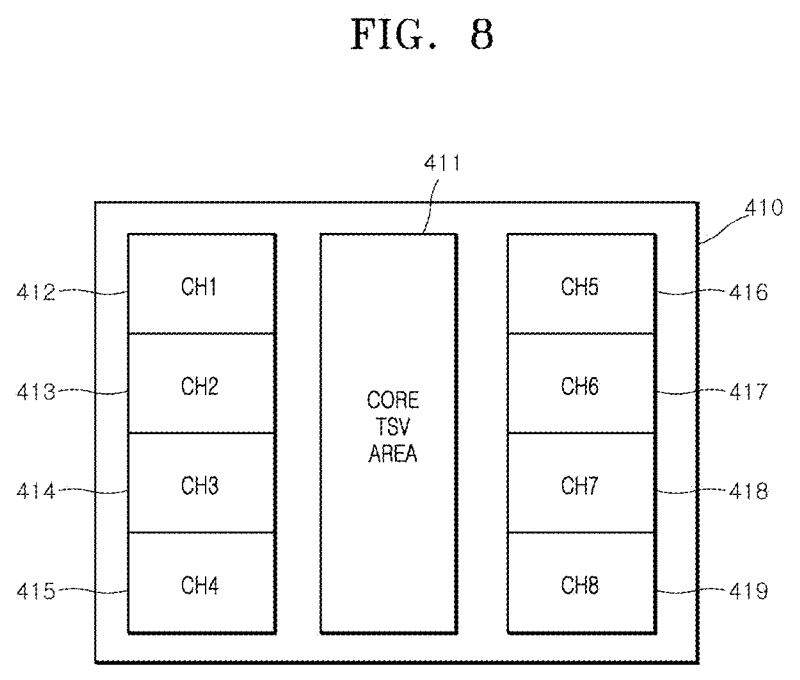

The first transfer request generation circuit 121-1 includes a first switch SW1 121-11 and the first system interface 121-12. The first switch 121-11 is turned on when the first channel selection signal CSEL<1> is enabled at a logic high level. The first switch 121-11 receives the requests REQ when the first channel selection signal CSEL<1> is enabled at a logic high level and outputs the requests REQ. The first switch 121-11 blocks input of the requests REQ when the first channel selection signal CSEL<1> is disabled at a logic low level. The first system interface 121-12 outputs, as the first transfer request TREQ1, the requests REQ received when the first channel selection signal CSEL<1> is enabled at a logic high level. The first system interface 121-12 is a component that transmits the requests REQ to the first channel CH1 412, such as shown in FIG. 8, included in the first core chip 410. Although the first transfer request TREQ1 is illustrated as one signal, the first transfer request TREQ1 may include a plurality of bits including a command and an address that control operations of the stack memory device 400, such as an active operation, a write operation, a read operation, and a precharge operation. The request REQ transmitted to the first channel CH1 412 included in the first core chip 410 may be a first request.

The second transfer request generation circuit 121-2 includes a second switch SW2 121-21 and the second system interface 121-22. The second switch 121-21 is turned on when the second channel selection signal CSEL<2> is enabled at a logic high level. The second switch 121-21 receives the requests REQ when the second channel selection signal CSEL<2> is enabled at a logic high level and outputs the request REQ. The second switch 121-21 blocks input of the requests REQ when the second channel selection signal CSEL<2> is disabled at a logic low level. The second system interface 121-22 outputs, as the second transfer request TREQ2, the requests REQ received when the second channel selection signal CSEL<2> is enabled at a logic high level. The second system interface 121-22 is a component that transmits the requests REQ to the second channel CH2 413 included in the first core chip 410, such as shown in FIG. 8. Although the second transfer request TREQ2 is illustrated as one signal, the second transfer request TREQ2 may include a plurality of bits including a command and an address that control operations of the stack memory device 400, such as an active operation, a write operation, a read operation, and a precharge operation. The request REQ transmitted to the second channel CH2 413 included in the first core chip 410 may be a second request.

The thirty-second transfer request generation circuit 121-32 includes a thirty-second switch SW32 121-321 and the thirty-second system interface 121-322. The thirty-second switch 121-321 is turned on when the thirty-second channel selection signal CSEL<32> is enabled at a logic high level. The thirty-second switch 121-321 receives the requests REQ when the thirty-second channel selection signal CSEL<32> is enabled at a logic high level and outputs the requests REQ. The thirty-second switch 121-321 blocks input of the requests REQ when the thirty-second channel selection signal CSEL<32> is disabled at a logic low level. The thirty-second system interface 121-322 outputs, as the thirty-second transfer request TREQ32, the requests REQ received when the thirty-second channel selection signal CSEL<32> is enabled at a logic high level. The thirty-second system interface 121-322 is a component that transmits the request REQ to a thirty-second channel (not illustrated) that is included in the fourth core chip 450. Although the thirty-second transfer request TREQ32 is illustrated as one signal, the thirty-second transfer request TREQ32 may include a plurality of bits including a command and an address that control operations of the stack memory device 400, such as an active operation, a write operation, a read operation, and a precharge operation. The request REQ transmitted to the thirty-second channel included in the fourth core chip 450 may be a thirty-second request.

Each of the third to thirty-first transfer request generation circuits is implemented with a similar circuit to and performs similar operations as performed by the first transfer request generation circuit 121-1, the second transfer request generation circuit 121-2, and the thirty-second transfer request generation circuit 121-32 except that the input and output signals of the third to thirty-first transfer request generation circuits are different from the input and output signals of the first transfer request generation circuit 121-1, the second transfer request generation circuit 121-2, and the thirty-second transfer request generation circuit 121-32.

Figure 4:
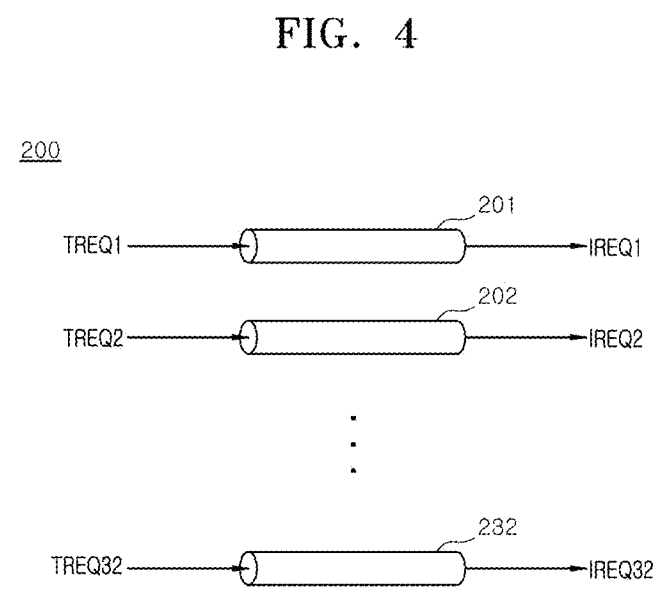

FIG. 4 is a diagram illustrating an embodiment of the interposer 200, for example, as included in the semiconductor system 1 illustrated in FIG. 1. The interposer 200 includes the first wire 201 to the thirty-second wire 232.

The interposer 200 electrically connects the system chip 100 and the base chip 300 through the wires 201 to 232.

The first wire 201 may be implemented with a metal line made of a conductive material. The first wire 201 is a component over which the requests REQ are transmitted to the first channel CH1 412, such as shown in FIG. 8, included in the first core chip 410. The first transfer request TREQ1 is output as a first input request IREQ1 over the first wire 201. Although the first input request IREQ1 is illustrated as one signal, the first input request IREQ1 may include a plurality of bits including a command and an address that control operations of the stack memory device 400, such as an active operation, a write operation, a read operation, and a precharge operation.

The second wire 202 may be implemented with a metal line made of a conductive material. The second wire 202 is a component over which the requests REQ are transmitted to the second channel CH2 413, such as shown in FIG. 8, included in the first core chip 410. The second transfer request TREQ2 is output as a second input request IREQ2 over the second wire 202. Although the second input request IREQ2 is illustrated as one signal, the second input request IREQ2 may include a plurality of bits including a command and an address that control operations of the stack memory device 400, such as an active operation, a write operation, a read operation, and a precharge operation.

The thirty-second wire 232 may be implemented with a metal line made of a conductive material. The thirty-second wire 232 is a component over which the requests REQ are transmitted to the thirty-second channel (not illustrated) included in the fourth core chip 440. The thirty-second transfer request TREQ32 is output as a thirty-second input request IREQ32 over the thirty-second wire 232. Although the thirty-second input request IREQ32 is illustrated as one signal, the thirty-second input request IREQ32 may include a plurality of bits including a command and an address that control operations of the stack memory device 400, such as an active operation, a write operation, a read operation, and a precharge operation.

Each of the third to thirty-first wires is implemented with a similar component and performs similar functions as performed by each of the first wire 201, the second wire 202, and the thirty-second wire 232 except that the input and output signals of the third to thirty-first wires are different from the input and output signals of the first wire 201, the second wire 202, and the thirty-second wire 232.

Figure 5:
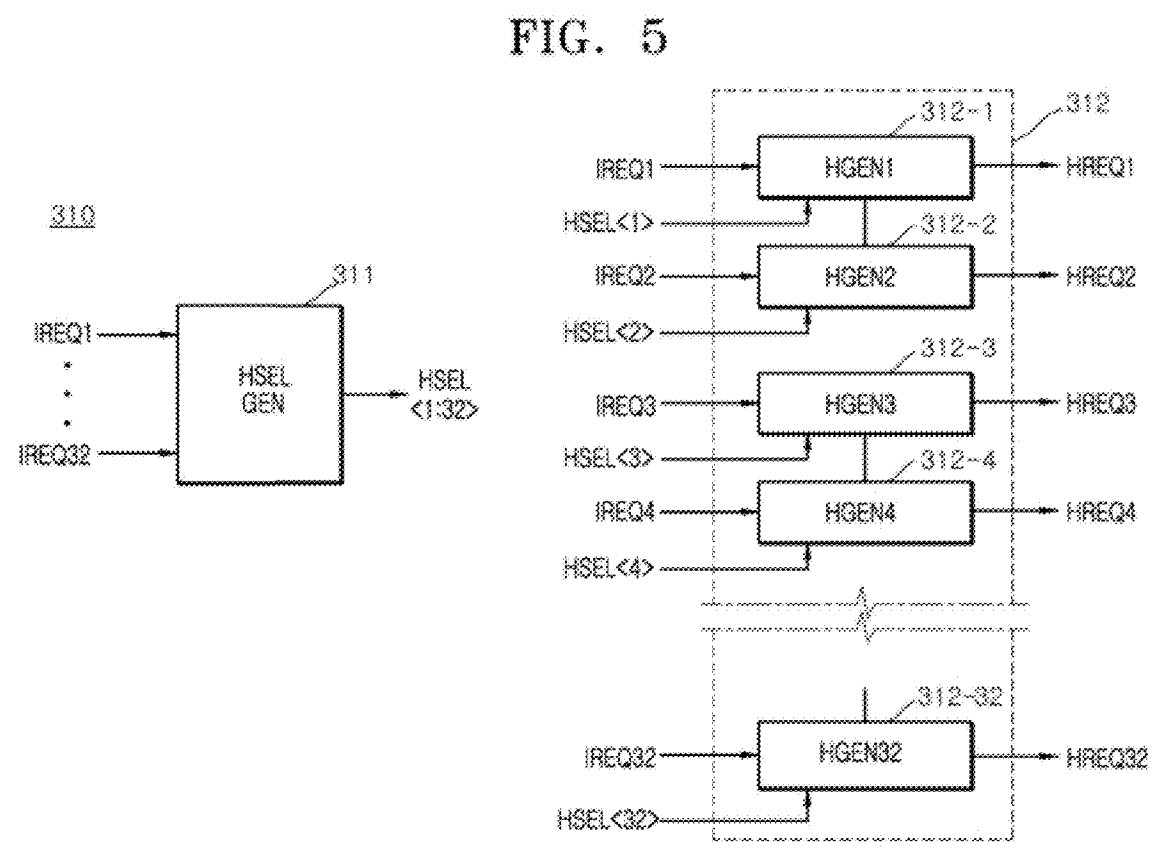

FIG. 5 is a block diagram illustrating an embodiment of the HBM interface circuit 310, for example, as included in the base chip 300 illustrated in FIG. 1. An HBM interface circuit 310 includes a memory selection signal generation circuit HSEL GEN 311 and a memory request generation circuit 312.

The memory selection signal generation circuit 311 generates first to thirty-second memory selection signals HSEL<1:32> based on the first input request IREQ1 to the thirty-second input request IREQ32. The memory selection signal generation circuit 311 generates the first to thirty-second memory selection signals HSEL<1:32> based on addresses included in the input requests IREQ1 to IREQ32.

The memory selection signal generation circuit 311 generates the first memory selection signal HSEL<1> enabled at a logic high level when an address included in the first input request IREQ1 selects the first channel CH1 412 included in the first core chip 410, such as shown in FIG. 8. The memory selection signal generation circuit 311 generates the second memory selection signal HSEL<2> disabled at a logic low level when an address included in the first input request IREQ1 selects the second channel CH2 413 included in the first core chip 410, such as shown in FIG. 8. The example in which the address included in the first input request IREQ1 selects the second channel CH2 413 included in the first core chip 410 is an example in which a fail occurs in the second system interface 121-22.

The memory selection signal generation circuit 311 generates the second memory selection signal HSEL<2> enabled at a logic high level when an address included in the second input request IREQ2 selects the second channel CH2 413 included in the first core chip 410, such as shown in FIG. 8. The memory selection signal generation circuit 311 generates the first memory selection signal HSEL<1> disabled at a logic low level when an address included in the second input request IREQ2 selects the first channel CH1 412 included in the first core chip 410, such as shown in FIG. 8. The example in which the address included in the second input request IREQ2 selects the first channel CH1 412 included in the first core chip 410 is an example in which a fail occurs in the first system interface 121-12.

The memory selection signal generation circuit 311 generates the third memory selection signal HSEL<3> enabled at a logic high level when an address included in the third input request IREQ3 selects a third channel CH3 414 included in the first core chip 410, such as shown in FIG. 8. The memory selection signal generation circuit 311 generates the fourth memory selection signal HSEL<4> disabled at a logic low level when an address included in the third input request IREQ3 selects a fourth channel CH4 415 included in the first core chip 410, such as shown in FIG. 8. The example in which the address included in the third input request IREQ3 selects the fourth channel CH4 415 included in the first core chip 410 is an example in which a fail occurs in the fourth system interface 121-42.

The memory selection signal generation circuit 311 generates the fourth memory selection signal HSEL<4> enabled at a logic high level when an address included in the fourth input request IREQ4 selects the fourth channel CH4 415 included in the first core chip 410, such as shown in FIG. 8. The memory selection signal generation circuit 311 generates the third memory selection signal HSEL<3> disabled at a logic low level when an address included in the fourth input request IREQ4 selects the third channel CH3 414 included in the first core chip 410, such as shown in FIG. 8. The example in which the address included in the fourth input request IREQ4 selects the third channel CH3 414 included in the first core chip 410 is an example in which a fail occurs in the third system interface 121-32.

The memory selection signal generation circuit 311 generates the fifth to thirty-second memory selection signals HSEL<5:32> in a similar operation to generation of the first to fourth memory selection signals HSEL<1:4>.

The memory request generation circuit 312 includes first memory request generation circuit HGEN1 312-1 to thirty-second memory request generation circuit HGEN32 312-32.

The first memory request generation circuit 312-1 and the second memory request generation circuit 312-2 are electrically connected.

The first memory request generation circuit 312-1 generates a first memory request HREQ1 based on the first memory selection signal HSEL<1>, the first input request IREQ1, and the second input request IREQ2. The first memory request generation circuit 312-1 generates the first memory request HREQ1 from the first input request IREQ1 when the first memory selection signal HSEL<1> is enabled at a logic high level. The first memory request generation circuit 312-1 generates the first memory request HREQ1 from the second input request IREQ2 when the first memory selection signal HSEL<1> is disabled at a logic low level.

The second memory request generation circuit 312-2 generates a second memory request HREQ2 based on the second memory selection signal HSEL<2>, the first input request IREQ1, and the second input request IREQ2. The second memory request generation circuit 312-2 generates the second memory request HREQ2 from the second input request IREQ2 when the second memory selection signal HSEL<2> is enabled at a logic high level. The second memory request generation circuit 312-2 generates the second memory request HREQ2 from the first input request IREQ1 when the second memory selection signal HSEL<2> is disabled at a logic low level.

The third memory request generation circuit 312-3 and the fourth memory request generation circuit 312-4 are electrically connected.

The third memory request generation circuit 312-3 generates a third memory request HREQ3 based on the third memory selection signal HSEL<3>, the third input request IREQ3, and the fourth input request IREQ4. The third memory request generation circuit 312-3 generates the third memory request HREQ3 from the third input request IREQ3 when the third memory selection signal HSEL<3> is enabled at a logic high level. The third memory request generation circuit 312-3 generates the third memory request HREQ3 from the fourth input request IREQ4 when the third memory selection signal HSEL<3> is disabled at a logic low level.

The fourth memory request generation circuit 312-4 generates a fourth memory request HREQ4 based on the fourth memory selection signal HSEL<4>, the third input request IREQ3, and the fourth input request IREQ4. The fourth memory request generation circuit 312-4 generates the fourth memory request HREQ2 from the fourth input request IREQ4 when the fourth memory selection signal HSEL<4> is enabled at a logic high level. The fourth memory request generation circuit 312-4 generates the fourth memory request HREQ4 from the third input request IREQ3 when the fourth memory selection signal HSEL<4> is disabled at a logic low level.

Each of the fifth to thirty-second memory request generation circuits 312-5 to 312-32 is implemented with a similar circuit to and performs similar operations as each of the request generation circuits 312-1, 312-2, 312-3, and 312-4 except that the input and output signals of the memory request generation circuits 312-5 to 312-32 are different from the input and output signals of the memory request generation circuits 312-1, 312-2, 312-3, and 312-4.

The memory request generation circuit 312 blocks the input of an HBM interface in which a fail occurred, among the first to thirty-second HBM interfaces, based on the first to thirty-second memory selection signals HSEL<1:32>. The memory request generation circuit 312 outputs the input requests IREQ1 to IREQ32 as the memory requests HREQ1 to HREQ32 through the first to thirty-second HBM interfaces.

Figure 6:
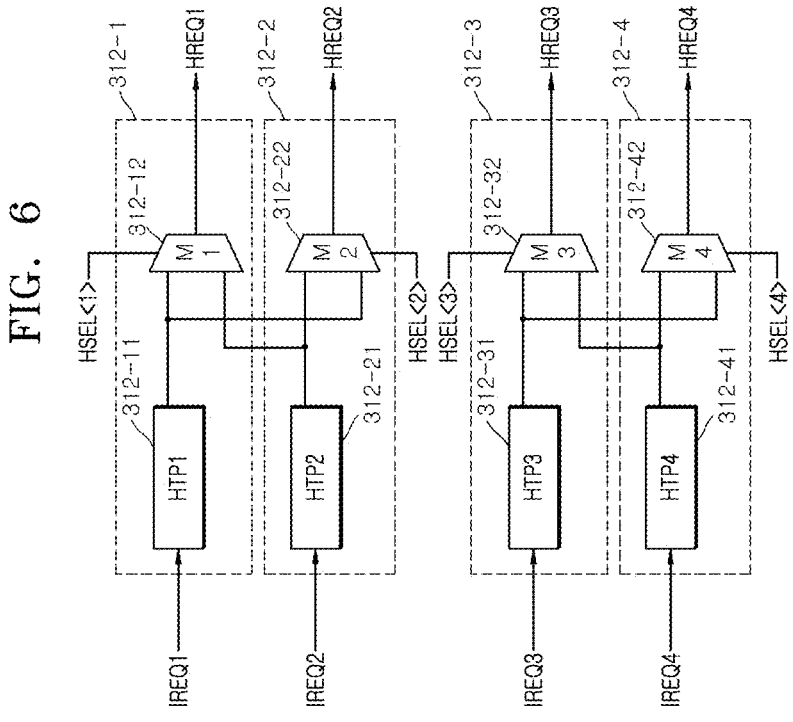
FIG. 6 is a block diagram illustrating an embodiment of memory request generation circuits included in an HBM interface circuit according to the present disclosure.

FIG. 6 is a block diagram illustrating an embodiment of the first to fourth memory request generation circuits 312-1 to 312-4, for example, as included in the memory request generation circuit 312 illustrated in FIG. 5.

The first memory request generation circuit 312-1 includes a first HBM interface HTP1 312-11 and a first multiplexer M1 312-12. The first HBM interface 312-11 receives and outputs the first input request IREQ1. The first multiplexer 312-12 outputs, as the first memory request HREQ1, the first input request IREQ1 output from the first HBM interface 312-11 when the first memory selection signal HSEL<1> is enabled at a logic high level. The first multiplexer 312-12 outputs, as the first memory request HREQ1, the second input request IREQ2 output from the second HBM interface 312-21 when the first memory selection signal HSEL<1> is disabled at a logic low level.

The second memory request generation circuit 312-2 includes a second HBM interface HTP2 312-21 and a second multiplexer M2 312-22. The second HBM interface 312-21 receives and outputs the second input request IREQ2. The second multiplexer 312-22 outputs, as the second memory request HREQ2, the second input request IREQ2 output from the second HBM interface 312-21 when the second memory selection signal HSEL<2> is enabled at a logic high level. The second multiplexer 312-22 outputs, as the second memory request HREQ2, the first input request IREQ1 output from the first HBM interface 312-11 when the second memory selection signal HSEL<2> is disabled at a logic low level.

The third memory request generation circuit 312-3 includes a third HBM interface HTP3 312-31 and a third multiplexer M3 312-32. The third HBM interface 312-31 receives and outputs the third input request IREQ3. The third multiplexer 312-32 outputs, as the third memory request HREQ3, the third input request IREQ3 output from the third HBM interface 312-31 when the third memory selection signal HSEL<3> is enabled at a logic high level. The third multiplexer 312-32 outputs, as the third memory request HREQ3, the fourth input request IREQ4 output from the fourth HBM interface 312-41 when the third memory selection signal HSEL<3> is disabled at a logic low level.

The fourth memory request generation circuit 312-4 includes a fourth HBM interface HTP4 312-41 and a fourth multiplexer M4 312-42. The fourth HBM interface 312-41 receives and outputs the fourth input request IREQ4. The fourth multiplexer 312-42 outputs, as the fourth memory request HREQ4, the fourth input request IREQ4 output from the fourth HBM interface 312-41 when the fourth memory selection signal HSEL<4> is enabled at a logic high level. The fourth multiplexer 312-42 outputs, as the fourth memory request HREQ4, the third input request IREQ3 output from the third HBM interface 312-31 when the fourth memory selection signal HSEL<4> is disabled at a logic low level.

Each of the fifth memory request generation circuits 312-5 through the thirty-second memory request generation circuit 312-32 is implemented with a similar circuit to and performs similar operations as performed by the memory request generation circuits 312-1 to 312-4 except that the input and output signals of the fifth to thirty-second memory request generation circuits 312-5 to 312-32 are different from the input and output signals of the memory request generation circuits 312-1 to 312-4.

FIG. 7 is a block diagram illustrating an embodiment of the memory controller 320, for example, as included in the base chip 300 illustrated in FIG. 1. The memory controller 320 includes a first memory controller MC1 321-1 through a thirty-second memory controller MC32 321-32.

The first memory controller 321-1 generates the first command CMD1 and the first address ADD1 that control operation of the stack memory device 400 based on the first memory request HREQ1. The first memory controller 321-1 generates the first command CMD1 and the first address ADD1 based on a command and an address included in the first memory request HREQ1 transmitted to the first channel CH1 412 included in the first core chip 410, such as shown in FIG. 8. Although the first command CMD1 is illustrated as one signal, the first command CMD1 may include a plurality of bits that controls operation of the first channel CH1 412 included in the first core chip 410. Although the first address ADD1 is illustrated as one signal, the first address ADD1 may include a plurality of bits that controls operation of the first channel CH1 412 included in the first core chip 410.

The second memory controller 321-2 generates the second command CMD2 and the second address ADD2 that control operation of the stack memory device 400 based on the second memory request HREQ2. The second memory controller 321-2 generates the second command CMD2 and the second address ADD2 based on a command and an address included in the second memory request HREQ2 transmitted to the second channel CH2 413 included in the first core chip 410, such as shown in FIG. 8. Although the second command CMD2 is illustrated as one signal, the second command CMD2 may include a plurality of bits that controls operation of the second channel CH2 413 included in the first core chip 410. Although the second address ADD2 is illustrated as one signal, the second address ADD2 may include a plurality of bits that controls operation of the second channel CH2 413 included in the first core chip 410.

The thirty-second memory controller 321-32 generates the thirty-second command CMD32 and the thirty-second address ADD32 that control operation of the stack memory device 400 based on the thirty-second memory request HREQ32. The thirty-second memory controller 321-32 generates the thirty-second command CMD32 and the thirty-second address ADD32 based on a command and an address included in the thirty-second memory request HREQ32 transmitted to the thirty-second channel (not illustrated) included in the fourth core chip 440. Although the thirty-second command CMD32 is illustrated as one signal, the thirty-second command CMD32 may include a plurality of bits that controls operation of the thirty-second channel included in the fourth core chip 440. Although the thirty-second address ADD32 is illustrated as one signal, the thirty-second address ADD32 may include a plurality of bits that controls operation of the thirty-second channel included in the fourth core chip 440.

Each of the third memory controller 321-3 to the thirty-first memory controller 321-31 performs similar operations as performed by the first memory controller 321-1, the second memory controller 321-2, and the thirty-second memory controller 321-32 except that the input and output signals of the first memory controller 321-1, the second memory controller 321-2, and the thirty-second memory controller 321-32 are different from the input and output signals of the first memory controller 321-1, the second memory controller 321-2, and the thirty-second memory controller 321-32.

FIG. 8 is a block diagram illustrating an embodiment of the first core chip 410, for example, as included in the stack memory device 400 illustrated in FIG. 1. The first core chip 410 includes a core through electrode area CORE TSV AREA 411, the first channel CH1 412, the second channel CH2 413, the third channel CH3 414, the fourth channel CH4 415, a fifth channel CH5 416, a sixth channel CH6 417, a seventh channel CH7 418, and an eighth channel CH8 419.

The core through electrode area 411 includes a plurality of through electrodes TSV such as shown in FIG. 1. The core through electrode area 411 may be disposed in the middle or central region of the first core chip 410. The core through electrode area 411 receives the commands CMD1 to CMD8 and the addresses ADD1 to ADD8 through the plurality of through electrodes TSV. The first channel 412, the second channel 413, the third channel 414, the fourth channel 415, the fifth channel 416, the sixth channel 417, the seventh channel 418, and the eighth channel 419 input and output data through the plurality of through electrodes TSV disposed in the core through electrode area 411.

The first channel 412 receives the first command CMD1 and the first address ADD1 through the plurality of through electrodes TSV included in the core through electrode area 411. The first channel 412 performs a write operation including storing data and a read operation including outputting stored data based on the first command CMD1 and the first address ADD1. The first channel 412 may be implemented with a common memory circuit including a plurality of memory cells.

The second channel 413 receives the second command CMD2 and the second address ADD2 through the plurality of through electrodes TSV included in the core through electrode area 411. The second channel 413 performs a write operation including storing data and a read operation including outputting stored data based on the second command CMD2 and the second address ADD2. The second channel 412 may be implemented with a common memory circuit including a plurality of memory cells.

Each of the third to eighth channels 414 to 419 is implemented with a similar circuit to and performs similar operations as performed by the channels 412 and 413 except that the input and output signals of the channels 414 to 419 are different from the input and output signals of the channels 412 and 413. The first channel 412, the second channel 413, the third channel 414, the fourth channel 415, the fifth channel 416, the sixth channel 417, the seventh channel 418, and the eighth channel 419 are configured to input and output data through different input lines and output lines. The first channel 412, the second channel 413, the third channel 414, the fourth channel 415, the fifth channel 416, the sixth channel 417, the seventh channel 418, and the eighth channel 419 may be configured to perform independent operations. For example, during the start of a write operation of the first channel 412, the second channel 413 may be configured to perform a read operation.

Each of the second core chip 420, the third core chip 430, and the fourth core chip 440 includes eight channels similar to the first core chip 410 and is implemented with a similar circuit to and performs similar operations as performed by the first core chip 410.

An operation including transmitting the requests REQ to the channels 412 to 415 according to an embodiment of the present disclosure is described with reference to FIG. 9. An example in which a fail occurs in the second system interface 121-22 and the second HBM interface 312-21 is described.

The requests REQ transmitted to the channels 412 to 415 is generated at the same time and includes a plurality of bits. The requests REQ transmitted to the channels 412 to 415 may be generated at different times. For example, the requests REQ transmitted to the second channel 413 may be generated after generating the requests REQ transmitted to the first channel 412.

Figure 9:
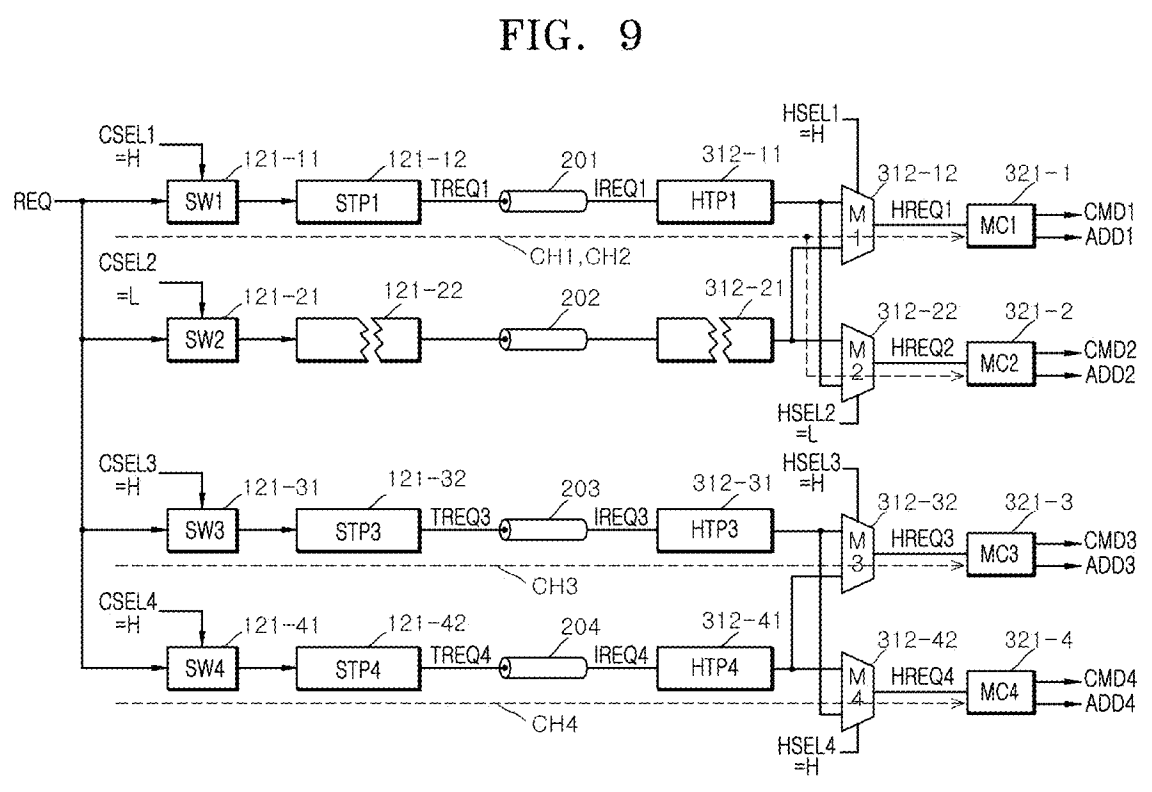

Referring to FIG. 9, the first switch 121-11 of the first transfer request generation circuit 121-1 is turned on when the first channel selection signal CSEL<1> is enabled at a logic high level and receives the requests REQ. The first system interface 121-12 of the first transfer request generation circuit 121-1 outputs, as the first transfer request TREQ1, the request REQ received when the first channel selection signal CSEL<1> is enabled at a logic high level. In this example, the request REQ output as the first transfer request TREQ1 includes a command and an address that control operation of the first channel 412 of the first core chip 410. The request REQ output as the first transfer request TREQ1 includes a command and an address that control operation of the second channel 413 of the first core chip 410.

The second switch 121-21 of the second transfer request generation circuit 121-2 is turned off when the second channel selection signal CSEL<2> is disabled at a logic low level.

The third switch 121-31 of the third transfer request generation circuit 121-3 is turned on when the third channel selection signal CSEL<3> is enabled at a logic high level and receives the requests REQ. The third system interface 121-32 of the third transfer request generation circuit 121-3 outputs, as the third transfer request TREQ3, the request REQ received when the third channel selection signal CSEL<3> is enabled at a logic high level. In this example, the request REQ output as the third transfer request TREQ3 includes a command and an address that control operation of the third channel 414 of the first core chip 410.

The fourth switch 121-41 of the fourth transfer request generation circuit 121-4 is turned on when the fourth channel selection signal CSEL<4> is enabled at a logic high level and receives the requests REQ. The fourth system interface 121-42 of the fourth transfer request generation circuit 121-4 outputs, as the fourth transfer request TREQ4, the request REQ received when the fourth channel selection signal CSEL<4> is enabled at a logic high level. In this example, the request REQ output as the fourth transfer request TREQ4 includes a command and an address that control operation of the fourth channel 415 of the first core chip 410.

The interposer 200 outputs the first transfer request TREQ1 as the first input request IREQ1 through the first wire 201.

The interposer 200 outputs the third transfer request TREQ3 as the third input request IREQ3 through the third wire 203.

The interposer 200 outputs the fourth transfer request TREQ4 as the fourth input request IREQ4 through the fourth wire 204.

The first HBM interface 312-11 of the first memory request generation circuit 312-1 receives and outputs the first input request IREQ1. The first multiplexer 312-12 of the first memory request generation circuit 312-1 outputs, as the first memory request HREQ1, the first input request IREQ1 output from the first HBM interface 312-11 when the first memory selection signal HSEL<1> is enabled at a logic high level. In this example, the first input request IREQ1 output as the first memory request HREQ1 includes a command and an address that control operation of the first channel 412 of the first core chip 410.

The second multiplexer 312-22 of the second memory request generation circuit 312-2 outputs, as the second memory request HREQ2, the first input request IREQ1 output from the first HBM interface 312-11 when the second memory selection signal HSEL<2> is disabled at a logic low level. In this example, the first input request IREQ1 output as the second memory request HREQ2 includes a command and an address that control operation of the second channel 413 of the first core chip 410.

The third HBM interface 312-31 of the third memory request generation circuit 312-3 receives and outputs the third input request IREQ3. The third multiplexer 312-32 of the third memory request generation circuit 312-3 outputs, as the third memory request HREQ3, the third input request IREQ3 output from the third HBM interface 312-31 when the third memory selection signal HSEL<3> is enabled at a logic high level. In this example, the request REQ output as the third transfer request TREQ3 includes a command and an address that control operation of the third channel 414 of the first core chip 410.

The fourth HBM interface 312-41 of the fourth memory request generation circuit 312-4 receives and outputs the fourth input request IREQ4. The fourth multiplexer 312-42 of the fourth memory request generation circuit 312-4 outputs, as the fourth memory request HREQ4, the fourth input request IREQ4 output from the fourth HBM interface 312-41 when the fourth memory selection signal HSEL<4> is enabled at a logic high level. In this example, the request REQ output as the fourth transfer request TREQ4 includes a command and an address that control operation of the fourth channel 415 of the first core chip 410.

The first memory controller 321-1 generates the first command CMD1 and the first address ADD1 based on a command and an address included in the first memory request HREQ1 transmitted to the first channel CH1 412 included in the first core chip 410. The first command CMD1 and the first address ADD1 are output to the first channel CH1 412 included in the first core chip 410 through the TSV interface circuit 330.

The second memory controller 321-2 generates the second command CMD2 and the second address ADD2 based on a command and an address included in the second memory request HREQ2 transmitted to the second channel CH2 413 included in the first core chip 410. The second command CMD2 and the second address ADD2 are output to the second channel CH2 413 included in the first core chip 410 through the TSV interface circuit 330.

The third memory controller 321-3 generates the third command CMD3 and the third address ADD3 based on a command and an address included in the third memory request HREQ3 transmitted to the third channel CH3 414 included in the first core chip 410. The third command CMD3 and the third address ADD3 are output to the third channel CH3 414 included in the first core chip 410 through the TSV interface circuit 330.

The fourth memory controller 321-4 generates the fourth command CMD4 and the fourth address ADD4 based on a command and an address included in the fourth memory request HREQ4 transmitted to the fourth channel CH4 415 included in the first core chip 410. The fourth command CMD4 and the fourth address ADD4 are output to the fourth channel CH4 415 included in the first core chip 410 through the TSV interface circuit 330.

The semiconductor system 1, according to an embodiment of the present disclosure, transmits the requests REQ to the stack memory device 400 to control operation of the stack memory device 400 by bypassing an interface in which a fail occurred. The semiconductor system 1 can prevent errors during operation of the stack memory device 400 by transmitting the requests REQ to the stack memory device 400 by bypassing an interface in which a fail occurred. The semiconductor system 1 can prevent defective or faulty processing of the stack memory device 400 by bypassing an interface in which a fail occurred.

Figure 10:
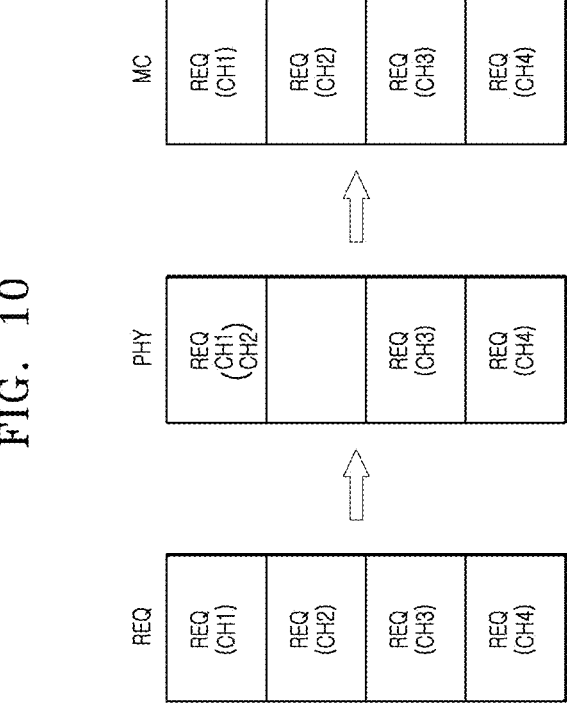

An operation including transmitting the requests REQ to the first to fourth channels 412 to 415 according to an embodiment of the present disclosure is described with reference to FIG. 10. An example in which a fail occurs in the second system interface 121-22 and the second HBM interface 312-21 is described.

The requests REQ are generated to include a command and an address to be transmitted to the first channel CH1

412, the second channel CH2 413, the third channel CH3 414, and the fourth channel CH4 415.

When a fail occurs in the second system interface 121-22 and second HBM interface 312-21 of an interface PHY, the requests REQ including a command and an address transmitted to the first channel CH1 412 and the second channel CH2 413 is transmitted through the first system interface 121-12 and the first HBM interface 312-11. The request REQ including a command and an address to be transmitted to the third channel CH3 414 is transmitted through the third system interface 121-32 and the third HBM interface 312-31. The request REQ including a command and an address to be transmitted to the fourth channel CH4 415 is transmitted through the fourth system interface 121-42 and the fourth HBM interface 312-41.

The first memory controller 321-1 of the memory controller MC generates the first command CMD1 and the first address ADD1 based on a command and an address that are included in the request REQ transmitted to the first channel CH1 412 included in the first core chip 410. The second memory controller 321-2 generates the second command CMD2 and the second address ADD2 based on a command and an address that are included in the request REQ transmitted to the second channel CH2 413 included in the first core chip 410. The third memory controller 321-3 generates the third command CMD3 and the third address ADD3 based on a command and an address included in the request REQ transmitted to the third channel CH3 414 included in the first core chip 410. The fourth memory controller 321-4 generates the fourth command CMD4 and the fourth address ADD4 based on a command and an address included in the request REQ transmitted to the fourth channel CH4 415 included in the first core chip 410.

The semiconductor system 1, according to an embodiment of the present disclosure, transmits the requests REQ to the stack memory device 400 to control operation of the stack memory device 400 by bypassing an interface in which a fail occurred. The semiconductor system 1 can prevent errors during operation of the stack memory device 400 by transmitting the request REQ to the stack memory device 400 by bypassing an interface in which a fail occurred. The semiconductor system 1 can prevent defective or faulty processing of the stack memory device 400 by bypassing an interface in which a fail occurred.

Figure 11:
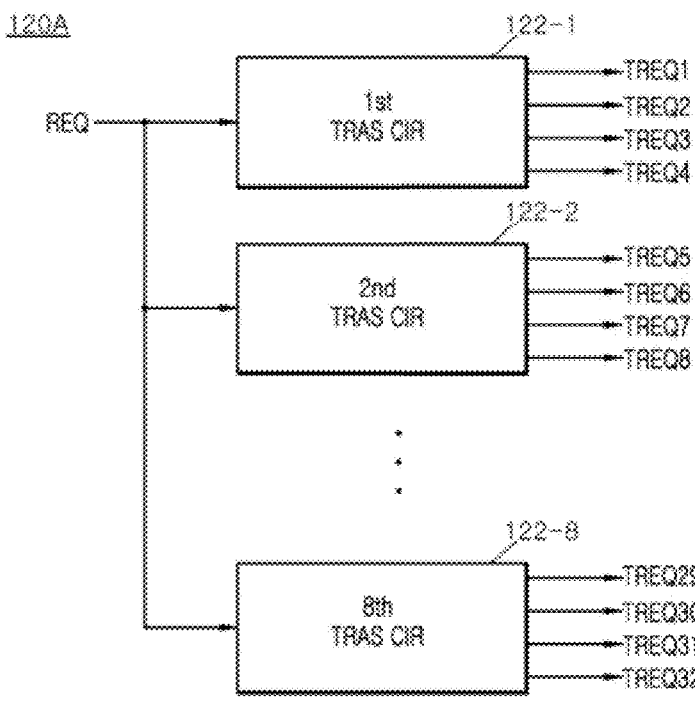
FIG. 11 is a block diagram illustrating an embodiment of the system interface circuit included in the system chip according to the present disclosure.

FIG. 11 is a block diagram illustrating an embodiment of the system interface circuit 120, for example, as included in the system chip 100 illustrated in FIG. 1. A system interface circuit 120A includes a first request transfer circuit 1$^{st}$ TRAS CIR 122-1 through an eighth request transfer circuit 8$^{th}$ TRAS CIR 122-8.

The first request transfer circuit 122-1 generates the first transfer request TREQ1, the second transfer request TREQ2, the third transfer request TREQ3, and the fourth transfer request TREQ4 based on the requests REQ. The first request transfer circuit 122-1 outputs, as the first transfer request TREQ1, a request REQ transmitted to the first channel CH1 412 included in the first core chip 410 from among the requests REQ. The first request transfer circuit 122-1 outputs, as the second transfer request TREQ2, a request REQ transmitted to the second channel CH2 413 included in the first core chip 410 from among the requests REQ. The first request transfer circuit 122-1 outputs, as the third transfer request TREQ3, a request REQ transmitted to the third channel CH3 414 included in the first core chip 410 from among the requests REQ. The first request transfer circuit 122-1 outputs, as the fourth transfer request TREQ4, a request REQ transmitted to the fourth channel CH4 415 included in the first core chip 410 from among the requests REQ.

The second request transfer circuit 122-2 generates the fifth transfer request TREQ5, the sixth transfer request TREQ6, the seventh transfer request TREQ7, and the eighth transfer request TREQ8 by splitting the requests REQ. The second request transfer circuit 122-2 outputs, as the fifth transfer request TREQ5, a request REQ transmitted to the fifth channel CH5 416 included in the first core chip 410 from among the requests REQ. The second request transfer circuit 122-2 outputs, as the sixth transfer request TREQ6, a request REQ transmitted to the sixth channel CH6 417 included in the first core chip 410 from among the requests REQ. The second request transfer circuit 122-2 outputs, as the seventh transfer request TREQ7, a request REQ transmitted to the seventh channel CH7 418 included in the first core chip 410 from among the requests REQ. The second request transfer circuit 122-2 outputs, as the eighth transfer request TREQ8, a request REQ transmitted to the eighth channel CH8 419 included in the first core chip 410 from among the requests REQ.

The eighth request transfer circuit 122-8 generates the twenty-ninth transfer request TREQ29, the thirtieth transfer request TREQ30, the thirty-first transfer request TREQ31, and the thirty-second transfer request TREQ32 by splitting the requests REQ. The eighth request transfer circuit 122-8 outputs, as the twenty-ninth transfer request TREQ29, a request REQ transmitted to a twenty-ninth channel (not illustrated) included in the fourth core chip 440 from among the requests REQ. The eighth request transfer circuit 122-8 outputs, as the thirtieth transfer request TREQ30, a request REQ transmitted to a thirtieth channel (not illustrated) included in the fourth core chip 440 from among the requests REQ. The eighth request transfer circuit 122-8 outputs, as the thirty-first transfer request TREQ31, a request REQ transmitted to a thirty-first channel (not illustrated) included in the fourth core chip 440 from among the requests REQ. The eighth request transfer circuit 122-8 outputs, as the thirty-second transfer request TREQ32, a request REQ transmitted to the thirty-second channel (not illustrated) included in the fourth core chip 440 from among the requests REQ.

Each of the third request transfer circuit 122-3 through the seventh request transfer circuit 122-7 is implemented with a similar circuit to and performs similar operations as performed by the first request transfer circuit 122-1, the second request transfer circuit 122-2, and the eighth request transfer circuit 122-8 except that the input and output signals of the third to seventh request transfer circuits 122-3 to 122-7 are different from the input and output signals of the first request transfer circuit 122-1, the second request transfer circuit 122-2, and the eighth request transfer circuit 122-8.

In the system chip 100 including the system interface circuit 120A illustrated in FIG. 11 according to an embodiment of the present disclosure, four system interfaces form one group including a first system interface, a second system interface, a third system interface, and a fourth system interface. The system chip 100 including the system interface circuit 120A outputs the requests REQ as four transfer requests through the first system interface, the second system interface, and the third system interface, where the first system interface and the second system interface are adjacent to the fourth system interface in which a fail occurred.

In the base chip 300 connected to the system interface circuit 120A illustrated in FIG. 11 according to an embodiment of the present disclosure, four HBM interfaces form one group including a first HBM interface, a second HBM interface, a third HBM interface, and a fourth HBM interface. The base chip 300 connected to the system interface circuit 120A receives four input requests from the first HBM interface, the second HBM interface, and the third HBM interface, where the first HBM interface and the second HBM interface are adjacent to the fourth HBM interface in which a fail occurred.

Figure 12:
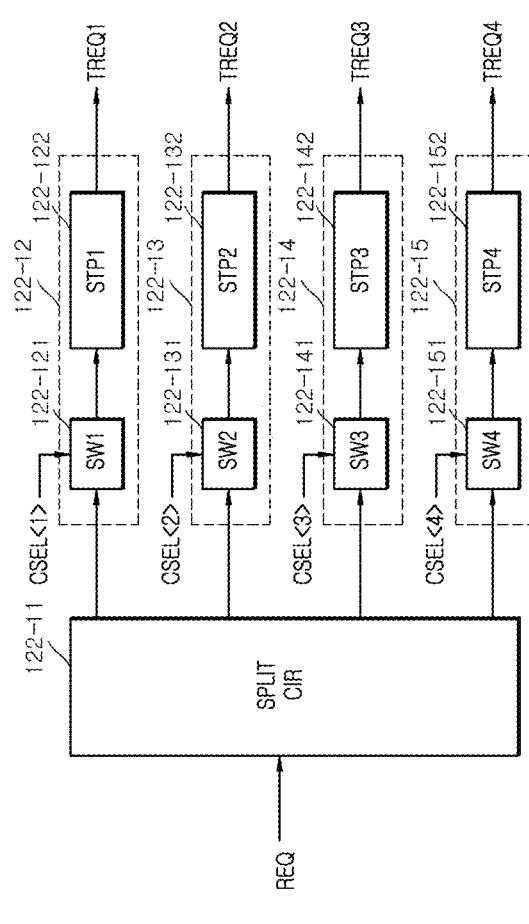
FIG. 12 is a block diagram illustrating an embodiment of a first request transfer circuit included in the system interface circuit according to the present disclosure.

FIG. 12 is a block diagram illustrating an embodiment of the first request transfer circuit 122-1, for example, as included in the system interface circuit 120A illustrated in FIG. 11. The first request transfer circuit 122-1 includes a split circuit SPLIT CIR 122-11, a first transfer request generation circuit 122-12, a second transfer request generation circuit 122-13, a third transfer request generation circuit 122-14, and a fourth transfer request generation circuit 122-15.

The split circuit 122-11 splits the requests REQ. The split circuit 122-11 outputs, to the first transfer request generation circuit 122-12, the requests REQ to be transmitted to the first channel CH1 412 included in the first core chip 410 from among the requests REQ. The split circuit 122-11 outputs, to the second transfer request generation circuit 122-13, the requests REQ to be transmitted to the second channel CH2 413 included in the first core chip 410 from among the requests REQ. The split circuit 122-11 outputs, to the third transfer request generation circuit 122-14, the requests REQ to be transmitted to the third channel CH3 414 included in the first core chip 410 from among the requests REQ. The split circuit 122-11 outputs, to the fourth transfer request generation circuit 122-15, the request REQ to be transmitted to the fourth channel CH4 415 included in the first core chip 410 from among the requests REQ.

When a fail occurs in a first system interface STP1 122-122 and a first memory interface HTP1 314-11 associated with the first channel 412, the split circuit 122-11 splits the requests REQ and outputs, to the second transfer request generation circuit 122-13, the third transfer request generation circuit 122-14, and the fourth transfer request generation circuit 122-15, the requests REQ to be transmitted to the first channel CH1 412. When a fail occurs in a second system interface STP2 122-132 and a second memory interface HTP2 314-21 associated with the second channel CH2 413, the split circuit 122-11 splits the requests REQ and outputs, to the first transfer request generation circuit 122-12, the third transfer request generation circuit 122-14, and the fourth transfer request generation circuit 122-15, the requests REQ to be transmitted to the second channel CH2 413 included in the first core chip 410. When a fail occurs in a third system interface STP3 122-142 and a third memory interface HTP3 314-31 associated with the third channel CH3 414, the split circuit 122-11 splits the requests REQ and outputs, to the first transfer request generation circuit 122-12, the second transfer request generation circuit 122-13, and the fourth transfer request generation circuit 122-15, the requests REQ to be transmitted to the third channel CH3 414 included in the first core chip 410. When a fail occurs in a fourth system interface STP4 122-152 and a fourth memory interface HTP4 314-41 associated with the fourth channel CH4 415, the split circuit 122-11 splits the requests REQ and outputs, to the first transfer request generation circuit 122-12, the second transfer request generation circuit 122-13, and the third transfer request generation circuit 122-14, the requests REQ to be transmitted to the fourth channel CH4 415 included in the first core chip 410. The request REQ transmitted to the first channel CH1 412 included in the first core chip 410 is a first request. The request REQ transmitted to the second channel CH2 413 included in the first core chip 410 is a second request. The request REQ transmitted to the third channel CH3 414 included in the first core chip 410 is a third request. The request REQ transmitted to the fourth channel CH4 415 included in the first core chip 410 is a fourth request.

The first transfer request generation circuit 122-12 includes a first switch SW1 122-121 and the first system interface 122-122. The first switch 122-121 is turned on when the first channel selection signal CSEL<1> is enabled at a logic high level. The first switch 122-121 receives the first request REQ when the first channel selection signal CSEL<1> is enabled at a logic high level and outputs the first request REQ. The first switch 122-121 blocks input of the first request REQ when the first channel selection signal CSEL<1> is disabled at a logic low level. The first channel selection signal CSEL<1> is generated by the channel selection signal generation circuit 112, such as illustrated in FIG. 2. The first system interface 122-122 outputs, as the first transfer request TREQ1, the first request REQ received when the first channel selection signal CSEL<1> is enabled at a logic high level. The first system interface 122-122 is a component that transmits the first request REQ to the first channel CH1 412 included in the first core chip 410. The first transfer request generation circuit 122-12 outputs the first request REQ as the first transfer request TREQ1 based on the first channel selection signal CSEL<1>. The first transfer request generation circuit 122-12 outputs the first request REQ as the first transfer request TREQ1 when the first channel selection signal CSEL<1> is enabled at a logic high level. Although the first transfer request TREQ1 is illustrated as one signal, the first transfer request TREQ1 may include a plurality of bits including a command and an address that control operation of the stack memory device 400, such as an active operation, a write operation, a read operation, and a precharge operation.

The second transfer request generation circuit 122-13 may include a second switch SW2 122-131 and the second system interface 122-132. The second switch 122-131 is turned on when the second channel selection signal CSEL<2> is enabled at a logic high level. The second switch 122-131 receives the second request REQ when the second channel selection signal CSEL<2> is enabled at a logic high level and outputs the second request REQ. The second switch 122-131 blocks input of the second request REQ when the second channel selection signal CSEL<2> is disabled at a logic low level. The second channel selection signal CSEL<2> is generated by the channel selection signal generation circuit 112, such as illustrated in FIG. 2. The second system interface 122-132 outputs, as the second transfer request TREQ2, the second request REQ received when the second channel selection signal CSEL<2> is enabled at a logic high level. The second system interface 122-132 is a component that transmits the second request REQ to the second channel CH2 413 included in the first core chip 410. The second transfer request generation circuit 122-13 outputs the second request REQ as the second transfer request TREQ2 based on the second channel selection signal CSEL<2>. The second transfer request generation circuit 122-13 outputs the second request REQ as the second transfer request TREQ2 when the second channel selection signal CSEL<2> is enabled at a logic high level. Although the second transfer request TREQ2 is illustrated as one signal, the second transfer request TREQ2 may include a plurality of bits including a command and an address that control operation of the stack memory device 400, such as an active operation, a write operation, a read operation, and a precharge operation.

The third transfer request generation circuit 122-14 includes a third switch SW3 122-141 and the third system interface 122-142. The third switch 122-141 is turned on when the third channel selection signal CSEL<3> is enabled at a logic high level. The third switch 122-141 receives the third request REQ when the third channel selection signal CSEL<3> is enabled at a logic high level and outputs the third request REQ. The third switch 122-141 blocks input of the third request REQ when the third channel selection signal CSEL<3> is disabled at a logic low level. The third channel selection signal CSEL<3> is generated by the channel selection signal generation circuit 112, such as illustrated in FIG. 2. The third system interface 122-142 outputs, as the third transfer request TREQ3, the third request REQ received when the third channel selection signal CSEL<3> is enabled at a logic high level. The third system interface 122-142 is a component that transmits the third request REQ to the third channel CH3 414 included in the first core chip 410. The third transfer request generation circuit 122-14 outputs the third request REQ as the third transfer request TREQ3 based on the third channel selection signal CSEL<3>. The third transfer request generation circuit 122-14 outputs the third request REQ as the third transfer request TREQ3 when the third channel selection signal CSEL<3> is enabled at a logic high level. Although the third transfer request TREQ3 is illustrated as one signal, the third transfer request TREQ3 may include a plurality of bits including a command and an address that control operation of the stack memory device 400, such as an active operation, a write operation, a read operation, and a precharge operation.

The fourth transfer request generation circuit 122-15 may include a fourth switch SW4 122-151 and the fourth system interface 122-152. The fourth switch 122-151 is turned on when the fourth channel selection signal CSEL<4> is enabled at a logic high level. The fourth switch 122-151 receives the fourth request REQ when the fourth channel selection signal CSEL<4> is enabled at a logic high level and outputs the fourth request REQ. The fourth switch 122-151 blocks input of the fourth request REQ when the fourth channel selection signal CSEL<4> is disabled at a logic low level. The fourth channel selection signal CSEL<4> is generated by the channel selection signal generation circuit 112, such as illustrated in FIG. 2. The fourth system interface 122-152 outputs, as the fourth transfer request TREQ4, the fourth request REQ received when the fourth channel selection signal CSEL<4> is enabled at a logic high level. The fourth system interface 122-152 is a component that transmits the fourth request REQ to the fourth channel CH4 415 included in the first core chip 410. The fourth transfer request generation circuit 122-15 outputs the fourth request REQ as the fourth transfer request TREQ4 based on the fourth channel selection signal CSEL<4>. The fourth transfer request generation circuit 122-15 outputs the fourth request REQ as the fourth transfer request TREQ4 when the fourth channel selection signal CSEL<4> is enabled at a logic high level. Although the fourth transfer request TREQ is illustrated as one signal, the fourth transfer request TREQ may include a plurality of bits including a command and an address that control operation of the stack memory device 400, such as an active operation, a write operation, a read operation, and a precharge operation.

Figure 13:
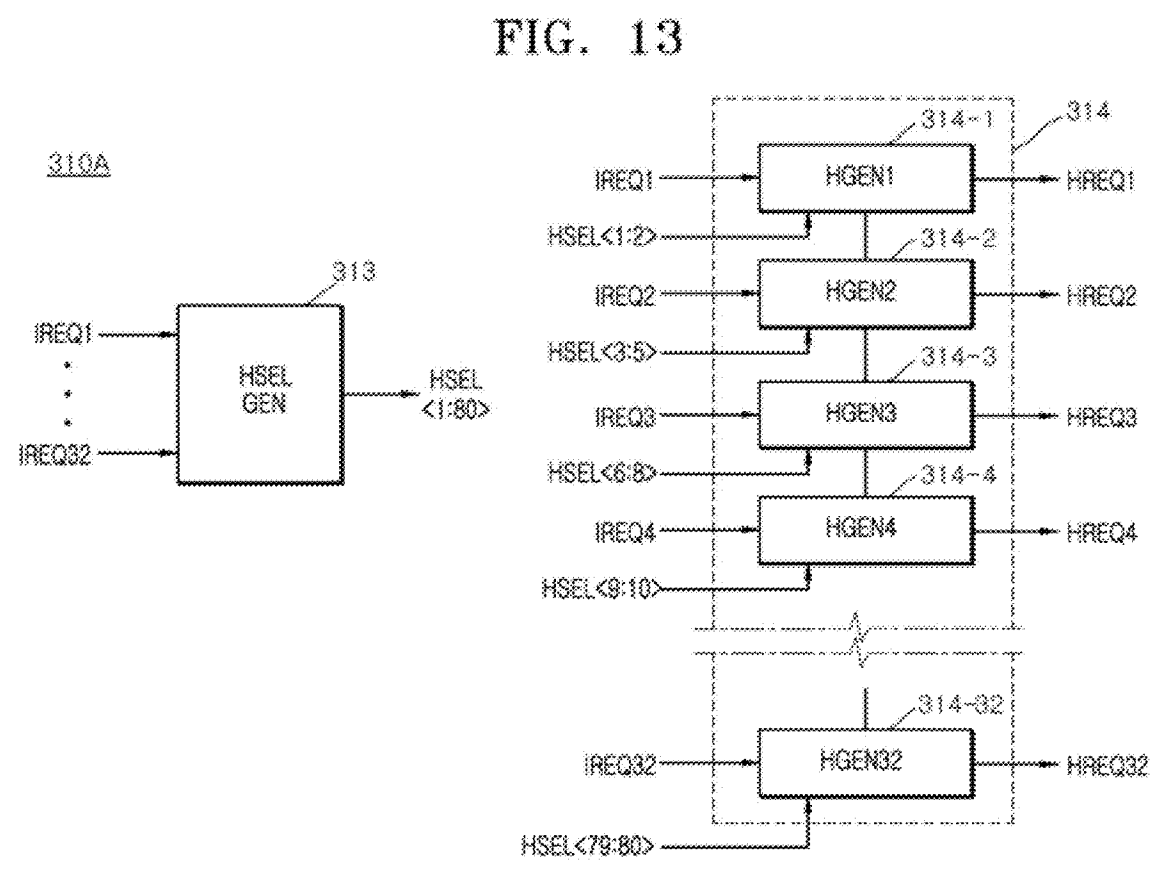

FIG. 13 is a block diagram illustrating an embodiment of the HBM interface circuit 310, for example, as included in the base chip 300 illustrated in FIG. 1. An HBM interface circuit 310A includes a memory selection signal generation circuit HSEL GEN 313 and a memory request generation circuit 314.

The memory selection signal generation circuit 313 generates first to eightieth memory selection signals HSEL<1: 80> based on the first input request IREQ1 to the thirty-second input request IREQ32. The memory selection signal generation circuit 313 generates the first to eightieth memory selection signals HSEL<1:80> based on addresses included in the input requests IREQ1 to IREQ32.

The memory selection signal generation circuit 313 generates the first memory selection signal HSEL<1> enabled at a logic high level when an address included in the first input request IREQ1 selects the first channel CH1 412 included in the first core chip 410.

The memory selection signal generation circuit 313 generates the second memory selection signal HSEL<2> enabled at a logic high level when an address included in the second input request IREQ2 selects the first channel CH1 412 included in the first core chip 410.

The memory selection signal generation circuit 313 generates the third memory selection signal HSEL<3> enabled at a logic high level when an address included in the first input request IREQ1 selects the second channel CH2 413 included in the first core chip 410.

The memory selection signal generation circuit 313 generates the fourth memory selection signal HSEL<4> enabled at a logic high level when an address included in the second input request IREQ2 selects the second channel CH2 413 included in the first core chip 410.

The memory selection signal generation circuit 313 generates the fifth memory selection signal HSEL<5> enabled at a logic high level when an address included in the third input request IREQ3 selects the second channel CH2 413 included in the first core chip 410.

The memory selection signal generation circuit 313 generates the sixth memory selection signal HSEL<6> enabled at a logic high level when an address included in the second input request IREQ2 selects the third channel CH3 414 included in the first core chip 410.

The memory selection signal generation circuit 313 generates the seventh memory selection signal HSEL<7> enabled at a logic high level when an address included in the third input request IREQ3 selects the third channel CH3 414 included in the first core chip 410.

The memory selection signal generation circuit 313 generates the eighth memory selection signal HSEL<8> enabled at a logic high level when an address included in the fourth input request IREQ4 selects the third channel CH3 414 included in the first core chip 410.

The memory selection signal generation circuit 313 generates the ninth memory selection signal HSEL<9> enabled at a logic high level when an address included in the fourth input request IREQ4 selects the third channel CH3 414 included in the first core chip 410.

The memory selection signal generation circuit 313 generates the tenth memory selection signal HSEL<10> enabled at a logic high level when an address included in the fourth input request IREQ4 selects the fourth channel CH4 415 included in the first core chip 410.

The memory selection signal generation circuit 313 generates the eleventh to eightieth memory selection signals HSEL<11:80> in a similar operation to generation of the first to tenth memory selection signals HSEL<1:10>.

The memory request generation circuit 314 includes first memory request generation circuit HGEN1 314-1 to thirty-second memory request generation circuit HGEN32 314-32.

The first memory request generation circuit 314-1 and the second memory request generation circuit 314-2 are electrically connected.

The first memory request generation circuit 314-1 generates the first memory request HREQ1 based on the first and second memory selection signals HSEL<1:2>, the first input request IREQ1, and the second input request IREQ1. The first memory request generation circuit 314-1 generates the first memory request HREQ1 from the first input request IREQ1 when the first memory selection signal HSEL<1> is enabled at a logic high level. The first memory request generation circuit 314-1 generates the first memory request HREQ1 from the second input request IREQ2 when the second memory selection signal HSEL<2> is enabled at a logic high level.

The second memory request generation circuit 314-2 and the third memory request generation circuit 314-3 are electrically connected.

The second memory request generation circuit 314-2 generates the second memory request HREQ2 based on third to fifth memory selection signals HSEL<3:5>, the first input request IREQ1, the second input request IREQ2, and the third input request IREQ3. The second memory request generation circuit 314-2 generates the second memory request HREQ2 from the first input request IREQ1 when the third memory selection signal HSEL<3> is enabled at a logic high level. The second memory request generation circuit 312-2 generates the second memory request HREQ2 from the second input request IREQ2 when the fourth memory selection signal HSEL<4> is enabled at a logic high level. The second memory request generation circuit 312-2 generates the second memory request HREQ2 from the third input request IREQ3 when the fifth memory selection signal HSEL<5> is enabled at a logic high level.

The third memory request generation circuit 314-3 and the fourth memory request generation circuit 314-4 are electrically connected.

The third memory request generation circuit 314-3 generates the third memory request HREQ3, based on the sixth to eighth memory selection signals HSEL<6:8>, the second input request IREQ2, the third input request IREQ3, and the fourth input request IREQ4. The third memory request generation circuit 314-3 generates the third memory request HREQ3 from the second input request IREQ2 when the sixth memory selection signal HSEL<6> is enabled at a logic high level. The third memory request generation circuit 312-3 generates the third memory request HREQ3 from the third input request IREQ3 when the seventh memory selection signal HSEL<7> is enabled at a logic high level. The third memory request generation circuit 312-3 generates the third memory request HREQ3 from the fourth input request IREQ4 when the eighth memory selection signal HSEL<8> is enabled at a logic high level.

The fourth memory request generation circuit 314-4 generates the fourth memory request HREQ4 based on the ninth and tenth memory selection signals HSEL<9:10>, the third input request IREQ3, and the fourth input request IREQ4. The fourth memory request generation circuit 314-4 generates the fourth memory request HREQ4 from the third input request IREQ3 when the ninth memory selection signal HSEL<9> is enabled at a logic high level. The fourth memory request generation circuit 312-4 generates the fourth memory request HREQ4 from the fourth input request IREQ4 when the tenth memory selection signal HSEL<10> is enabled at a logic high level.

Each of the fifth memory request generation circuit 314-5 through the thirty-second memory request generation circuit 314-32 is implemented with a similar circuit to and performs similar operations as performed by the memory request generation circuits 314-1 to 314-4 except that the input and output signals of the memory request generation circuits 314-5 to 314-32 are different from the input and output signals of the memory request generation circuits 314-1 to 314-4.

FIG. 14 is a block diagram illustrating an embodiment of the memory request generation circuits 314-1 to 314-4, for example, as included in the HBM interface circuit 314 illustrated in FIG. 13.

The first memory request generation circuit 314-1 includes the first HBM interface 314-11 and a first multiplexer M1 314-12. The first HBM interface 314-11 receives and output the first input request IREQ1. The first multiplexer 314-12 outputs, as the first memory request HREQ1, the first input request IREQ1 output from the first HBM interface 314-11 when the first memory selection signal HSEL<1> is enabled at a logic high level. The first multiplexer 314-12 outputs, as the first memory request HREQ1, the second input request IREQ2 output from the second HBM interface 314-21 when the second memory selection signal HSEL<2> is enabled at a logic high level.

The second memory request generation circuit 314-2 includes the second HBM interface 314-21 and a second multiplexer M2 314-22. The second HBM interface 314-21 receives and outputs the second input request IREQ2. The second multiplexer 314-22 outputs, as the second memory request HREQ2, the first input request IREQ1 output from the first HBM interface 314-11 when the third memory selection signal HSEL<3> is enabled at a logic high level. The second multiplexer 314-22 outputs, as the second memory request HREQ2, the second input request IREQ2 output from the second HBM interface 314-21 when the fourth memory selection signal HSEL<4> is enabled at a logic high level. The second multiplexer 314-22 outputs, as the second memory request HREQ2, the third input request IREQ3 output from the third HBM interface 314-31 when the fifth memory selection signal HSEL<5> is enabled at a logic high level.

The third memory request generation circuit 314-3 includes the third HBM interface 314-31 and a third multiplexer M3 314-32. The third HBM interface 314-31 receives and outputs the third input request IREQ3. The third multiplexer 314-32 outputs, as the third memory request HREQ3, the second input request IREQ2 output from the second HBM interface 314-21 when the sixth memory selection signal HSEL<6> is enabled at a logic high level. The third multiplexer 314-32 outputs, as the third memory request HREQ3, the third input request IREQ3 output from the third HBM interface 314-31 when the seventh memory selection signal HSEL<7> is enabled at a logic high level. The third multiplexer 314-32 outputs, as the third memory request HREQ3, the fourth input request IREQ4 output from the fourth HBM interface 314-41 when the eighth memory selection signal HSEL<8> is enabled at a logic high level.

The fourth memory request generation circuit 314-4 includes the fourth HBM interface 314-41 and a fourth multiplexer M4 314-42. The fourth HBM interface 314-41 receives and outputs the fourth input request IREQ4. The fourth multiplexer 314-42 outputs, as the fourth memory request HREQ4, the third input request IREQ3 output from the third HBM interface 314-31 when the ninth memory selection signal HSEL<9> is enabled at a logic high level. The fourth multiplexer 314-42 outputs, as the fourth memory request HREQ4, the fourth input request IREQ4 output from the fourth HBM interface 314-41 when the tenth memory selection signal HSEL<10> is enabled at a logic high level.

Each of the fifth memory request generation circuit 314-5 through the thirty-second memory request generation circuit 312-32 is implemented with a similar circuit to and performs similar operations as performed by the memory request generation circuits 314-1 to 314-4 except that the input and output signals of the memory request generation circuits 314-5 to 312-32 are different from the input and output signals of the memory request generation circuits 314-1 to 314-4.

Figure 15:
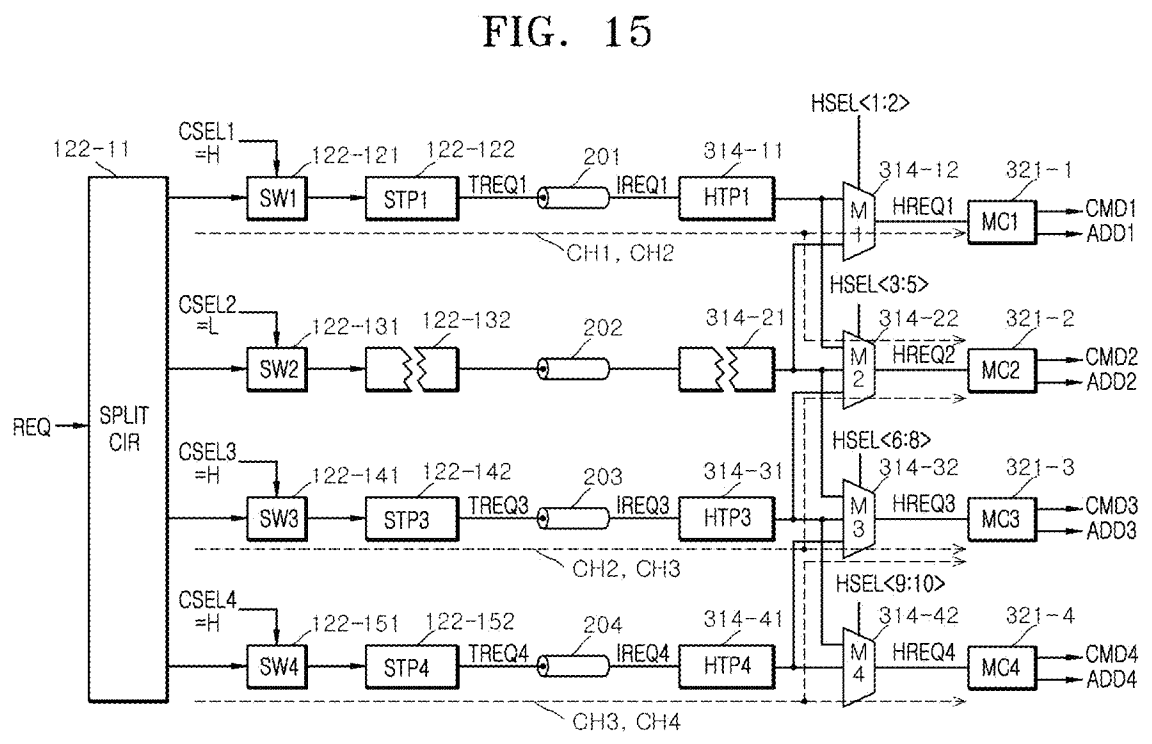

An operation including transmitting the requests REQ to the channels 412 to 415 according to an embodiment of the present disclosure is described with reference to FIG. 15. An example in which a fail occurs in the second system interface 122-132 and the second HBM interface 314-21 is described.

The requests REQ transmitted to the channels 412 to 415 are generated at the same time and include a plurality of bits. The requests REQ transmitted to the channels 412 to 415 may be generated at different times. For example, the request REQ transmitted to the second channel 413 is generated after generating the request REQ transmitted to the first channel 412.

The split circuit 122-11 outputs, to the first transfer request generation circuit 122-12, the requests REQ to be transmitted to the first channel CH1 412 included in the first core chip 410 from among the requests REQ. The split circuit 122-11 outputs, to the third transfer request generation circuit 122-14, the requests REQ to be transmitted to the third channel CH3 414 included in the first core chip 410 from among the requests REQ. The split circuit 122-11 outputs, to the fourth transfer request generation circuit 122-15, the requests REQ to be transmitted to the fourth channel CH 415 included in the first core chip 410 from among the requests REQ. When a fail occurs in the second system interface 122-132 and the second memory interface 314-21 associated with the second channel CH2 413, the split circuit 122-11 splits the requests REQ and outputs, to the first transfer request generation circuit 122-12, the third transfer request generation circuit 122-14, and the fourth transfer request generation circuit 122-15, the requests REQ to be transmitted to the second channel CH2 413 included in the first core chip 410.

The first switch 122-121 of the first transfer request generation circuit 122-12 is turned on when the first channel selection signal CSEL<1> is enabled at a logic high level and receives the requests REQ. The first system interface 122-122 of the first transfer request generation circuit 122-12 outputs, as the first transfer request TREQ1, the request REQ received when the first channel selection signal CSEL<1> is enabled at a logic high level. In this example, the request REQ output as the first transfer request TREQ1 includes a command and an address that control operation of the first channel 412 of the first core chip 410. The request REQ output as the first transfer request TREQ1 includes a command and an address that control operation of the second channel 413 of the first core chip 410.

The second switch 122-131 of the second transfer request generation circuit 122-13 is turned off when the second channel selection signal CSEL<2> is disabled at a logic low level.

The third switch 121-141 of the third transfer request generation circuit 122-14 is turned on when the third channel selection signal CSEL<3> is enabled at a logic high level and receives the requests REQ. The third system interface 122-142 of the third transfer request generation circuit 122-14 outputs, as the third transfer request TREQ3, the request REQ received when the third channel selection signal CSEL<3> is enabled at a logic high level. In this example, the request REQ output as the third transfer request TREQ3 includes a command and an address that control operation of the third channel 414 of the first core chip 410. The request REQ output as the third transfer request TREQ3 includes a command and an address that control operation of the second channel 413 of the first core chip 410.

The fourth switch 122-151 of the fourth transfer request generation circuit 122-15 is turned on when the fourth channel selection signal CSEL<4> is enabled at a logic high level and receives the requests REQ. The fourth system interface 122-152 of the fourth transfer request generation circuit 122-15 outputs, as the fourth transfer request TREQ4, the requests REQ received when the fourth channel selection signal CSEL<4> is enabled at a logic high level. In this example, the request REQ output as the fourth transfer request TREQ4 includes a command and an address that control operation of the fourth channel 415 of the first core chip 410. The request REQ output as the fourth transfer request TREQ4 includes a command and an address that control operation of the third channel 414 of the first core chip 410.

The interposer 200 outputs the first transfer request TREQ1 as the first input request IREQ1 through the first wire 201.

The interposer 200 outputs the third transfer request TREQ3 as the third input request IREQ3 through the third wire 203.

The interposer 200 outputs the fourth transfer request TREQ4 as the fourth input request IREQ4 through the fourth wire 204.

The first HBM interface 314-11 of the first memory request generation circuit 314-1 receives and outputs the first input request IREQ1. The first multiplexer 314-12 of the first memory request generation circuit 314-1 outputs, as the first memory request HREQ1, the first input request IREQ1 output from the first HBM interface 314-11 when the first memory selection signal HSEL<1> is enabled at a logic high level. In this example, the first input request IREQ1 output as the first memory request HREQ1 includes a command and an address that control operation of the first channel 412 of the first core chip 410.

The second multiplexer 314-22 of the second memory request generation circuit 314-2 outputs, as the second memory request HREQ2, the first input request IREQ1 output from the first HBM interface 314-11 when the third memory selection signal HSEL<3> is enabled at a logic high level. In this example, the first input request IREQ1 output as the second memory request HREQ2 includes a command and an address that control operation of the second channel 413 of the first core chip 410. The second multiplexer 314-22 of the second memory request generation circuit 314-2 outputs, as the second memory request HREQ2, the third input request IREQ3 output from the third HBM interface 314-13 when the fifth memory selection signal HSEL<5> is enabled at a logic high level. In this example, the first input request IREQ1 and the third input request IREQ3 output as the second memory request HREQ2 include a command and an address that control operation of the second channel 413 of the first core chip 410.

The third HBM interface 314-31 of the third memory request generation circuit 314-3 receives and outputs the third input request IREQ3. The third multiplexer 314-32 of the third memory request generation circuit 314-3 outputs, as the third memory request HREQ3, the third input request IREQ3 output from the third HBM interface 314-31 when the seventh memory selection signal HSEL<7> is enabled at a logic high level. The third multiplexer 314-32 of the third memory request generation circuit 314-3 outputs, as the third memory request HREQ3, the fourth input request IREQ4 output from the fourth HBM interface 314-41 when the eighth memory selection signal HSEL<8> is enabled at a logic high level. In this example, the third input request IREQ3 and the fourth input request IREQ4 output as the third memory request HREQ3 include a command and an address that control operation of the third channel 414 of the first core chip 410.

The fourth HBM interface 314-41 of the fourth memory request generation circuit 314-4 receives and outputs fourth input request IREQ4. The fourth multiplexer 314-42 of the fourth memory request generation circuit 314-4 outputs, as the fourth memory request HREQ4, the fourth input request IREQ4 output from the fourth HBM interface 314-41 when the tenth memory selection signal HSEL<10> is enabled at a logic high level. In this example, the fourth input request IREQ4 output as the fourth memory request HREQ4 includes a command and an address that control operation of the fourth channel 415 of the first core chip 410.

The first memory controller 321-1 generates the first command CMD1 and the first address ADD1 based on a command and an address included in the first memory request HREQ1 to be transmitted to the first channel CH1 412 included in the first core chip 410. The first command CMD1 and the first address ADD1 are output to the first channel CH1 412 included in the first core chip 410 through the TSV interface circuit 330.

The second memory controller 321-2 generates the second command CMD2 and the second address ADD2 based on a command and an address included in the second memory request HREQ2 to be transmitted to the second channel CH2 413 included in the first core chip 410. The second command CMD2 and the second address ADD2 are output to the second channel CH2 413 included in the first core chip 410 through the TSV interface circuit 330.

The third memory controller 321-3 generates the third command CMD3 and the third address ADD3 based on a command and an address included in the third memory request HREQ3 to be transmitted to the third channel CH3 414 included in the first core chip 410. The third command CMD3 and the third address ADD3 are output to the third channel CH3 414 included in the first core chip 410 through the TSV interface circuit 330.

The fourth memory controller 321-4 generates the fourth command CMD4 and the fourth address ADD4 based on a command and an address included in the fourth memory request HREQ4 to be transmitted to the fourth channel CH4 415 included in the first core chip 410. The fourth command CMD4 and the fourth address ADD4 are output to the fourth channel CH4 415 included in the first core chip 410 through the TSV interface circuit 330.

The semiconductor system 1, according to an embodiment of the present disclosure, splits the requests REQ that control operation of the stack memory device 400, bypasses an interface in which a fail occurred, and transmits the split requests REQ to the stack memory device 400. The semiconductor system 1 can prevent errors during operation of the stack memory device 400 by splitting the requests REQ, bypassing an interface in which a fail occurred, and transmitting the split requests REQ to the stack memory device 400. The semiconductor system 1 can prevent defective or faulty processing of the stack memory device 400 by bypassing an interface in which a fail occurred and transmitting the split requests REQ to the stack memory device 400.

Figure 16:
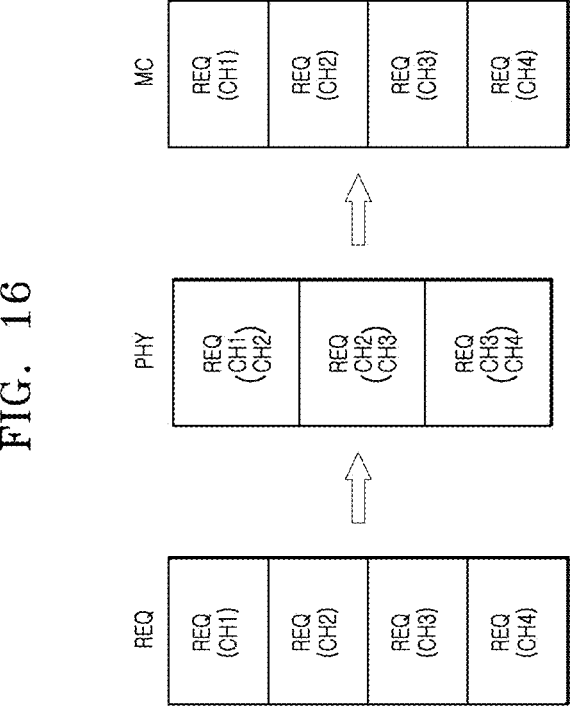

An operation including the requests REQ transmitted to the channels 412 to 415 according to an embodiment of the present disclosure is described with reference to FIG. 16. A fail occurring in the second system interface 122-132 and the second HBM interface 314-21 is described as an example.

The requests REQ are generated including a command and an address to be transmitted to the first channel CH1 412, the second channel CH2 413, the third channel CH3 414, and the fourth channel CH4 415.

The split circuit 122-11 of an interface PHY splits the requests REQ and outputs, to the first transfer request generation circuit 122-12, the third transfer request generation circuit 122-14, and the fourth transfer request generation circuit 122-15, the requests REQ to be transmitted to the first channel CH1 412, the third channel CH3 414, and the fourth channel CH4 415. When a fail occurs in the second system interface 122-132 and the second HBM interface 314-21, the split circuit 122-11 splits the requests REQ and outputs, to the first transfer request generation circuit 122-12, the third transfer request generation circuit 122-14, and the fourth transfer request generation circuit 122-15, the requests REQ to be transmitted to the second channel CH2 413 from among the requests REQ.

The requests REQ including a command and an address to be transmitted to the first channel CH1 412 and the second channel CH2 413 are transmitted through the first system interface 122-122 and the first HBM interface 314-11. The requests REQ including a command and an address to be transmitted to the second channel CH2 413 and the third channel CH3 414 are transmitted through the third system interface 122-132 and the third HBM interface 314-31. The requests REQ including a command and an address to be transmitted to the third channel CH3 414 and the fourth channel CH4 415 are transmitted through the fourth system interface 122-152 and the fourth HBM interface 314-41.

The first memory controller 321-1 of the memory controller MC generates the first command CMD1 and the first address ADD1 based on a command and an address included in the request REQ to be transmitted to the first channel CH1 412 included in the first core chip 410. The second memory controller 321-2 generates the second command CMD2 and the second address ADD2 based on a command and an address included in the request REQ to be transmitted to the second channel CH2 413 included in the first core chip 410. The third memory controller 321-3 generates the third command CMD3 and the third address ADD3 based on a command and an address included in the request REQ to be transmitted to the third channel CH3 414 included in the first core chip 410. The fourth memory controller 321-4 generates the fourth command CMD4 and the fourth address ADD4 based on a command and an address included in the request REQ to be transmitted to the fourth channel CH4 415 included in the first core chip 410.

The semiconductor system 1, according to an embodiment of the present disclosure transmits the requests REQ that control operation of the stack memory device 400 to the stack memory device 400 by splitting the requests REQ and bypassing an interface in which a fail occurred. The semiconductor system 1 can prevent errors during operation of the stack memory device 400 by bypassing an interface in which a fail occurred and transmitting the split requests REQ to the stack memory device 400. The semiconductor system 1 can prevent defective or faulty processing of the stack memory device 400 by bypassing an interface in which a fail occurred and transmitting the split requests REQ to the stack memory device 400.

Figure 17:
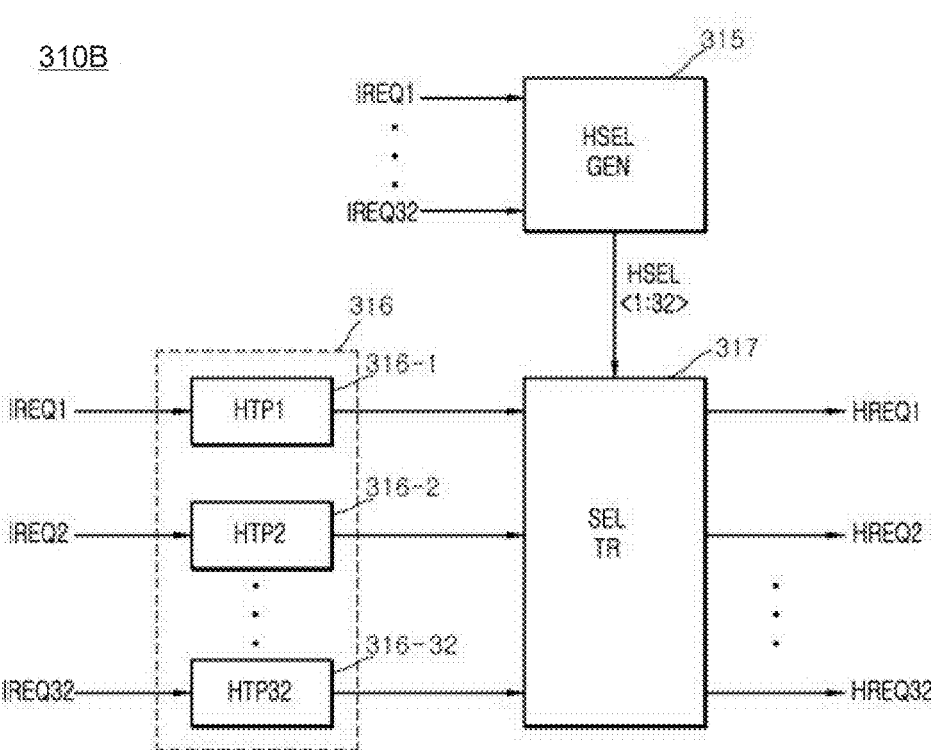
FIG. 17 is a block diagram illustrating an embodiment of the HBM interface circuit included in a base chip according to the present disclosure.

FIG. 17 is a block diagram illustrating an embodiment of the HBM interface circuit 310, for example, as included in the base chip 300 illustrated in FIG. 1. An HBM interface circuit 310B includes a memory selection signal generation circuit HSEL GEN 315, an input request reception circuit 316, and a selection transfer circuit SEL TR 317.

The memory selection signal generation circuit 315 generates the first to thirty-second memory selection signals HSEL<1:32> based on the first input request IREQ1 through the thirty-second input request IREQ32. The memory selection signal generation circuit 315 generates the first to thirty-second memory selection signals HSEL<1:32> based on addresses that are included in the input requests IREQ1 to IREQ32.

The memory selection signal generation circuit 315 generates the first memory selection signal HSEL<1> enabled at a logic high level when an address included in the input requests IREQ1 to IREQ32 selects the first channel CH1 412 included in the first core chip 410. The memory selection signal generation circuit 315 generates the second memory selection signal HSEL<2> enabled at a logic high level when an address included in the input requests IREQ1 to IREQ32 selects the second channel CH2 413 included in the first core chip 410. The memory selection signal generation circuit 315 generates the thirty-second memory selection signal HSEL<32> enabled at a logic high level when an address included in the input requests IREQ1 to IREQ32 selects the thirty-second channel (not illustrated) included in the fourth core chip 440.

The memory selection signal generation circuit 315 generates the third to thirty-first memory selection signals HSEL<3:31> in a similar operation to generation of the first memory selection signal HSEL<1>, the second memory selection signal HSEL<2>, and the thirty-second memory selection signal HSEL<32>.

The input request reception circuit 316 includes a first HBM interface HTP1 316-1 through a thirty-second HBM interface HTP32 316-32. The first HBM interface 316-1 receives and outputs the first input request IREQ1. The second HBM interface 316-2 receives and outputs the second input request IREQ2. The thirty-second HBM interface 316-32 receives and outputs the thirty-second input request IREQ32.

Each of the third HBM interface 316-3 through the thirty-first HBM interface 316-31 performs similar operations as performed by each of the first HBM interface 316-1, the second HBM interface 316-2, and the thirty-second HBM interface 316-32 except that an input request input to and output from the HBM interfaces 316-3 to 316-31 is different from the input request input to and output from the first HBM interface 316-1, the second HBM interface 316-2, and the thirty-second HBM interface 316-32.

The selection transfer circuit 317 outputs, as the first memory request HREQ1, an input request to be transmitted to the first channel CH1 412 included in the first core chip 410 from among the input requests IREQ1 to IREQ32 received from the HBM interfaces 316-1 to 316-32 when the first memory selection signal HSEL<1> is enabled. The selection transfer circuit 317 outputs, as the second memory request HREQ2, an input request to be transmitted to the second channel CH2 413 included in the first core chip 410 from among the input requests IREQ1 to IREQ32 received from the HBM interfaces 316-1 to 316-32 when the second memory selection signal HSEL<2> is enabled. The selection transfer circuit 317 outputs, as the thirty-second memory request HREQ32, an input request to be transmitted to the thirty-second channel (not illustrated) included in the fourth core chip 440 from among the input requests IREQ1 to IREQ32 received from the HBM interfaces 316-1 to 316-32 when the thirty-second memory selection signal HSEL<32> is enabled.

The semiconductor system 1, according to an embodiment of the present disclosure, transmits the requests REQ that controls operation of the stack memory device 400 to the stack memory device 400 by splitting the requests REQ and bypassing an interface in which a fail occurred. The semiconductor system 1 can prevent errors during operation of the stack memory device 400 by bypassing an interface in which a fail occurred and transmitting the split requests REQ to the stack memory device 400. The semiconductor system 1 can prevent defective or faulty processing of the stack memory device 400 by bypassing an interface in which a fail occurred and transmitting the split requests REQ to the stack memory device 400.

In the base chip 300 including the HBM interface circuit 310B illustrated in FIG. 17 according to an embodiment of the present disclosure, four HBM interfaces form one group including a first HBM interface, a second HBM interface, a third HBM interface, and a fourth HBM interface. The base chip 300 including the HBM interface circuit 310B receives the four input requests from the first HBM interface, the second HBM interface, and the third HBM interface, where the first HBM interface and the second HBM interface are adjacent to the fourth HBM interface in which a fail occurred. The base chip 300 including the HBM interface circuit 310B splits and transmit the received four input requests to the channels of the stack memory device 400.

Figure 18:
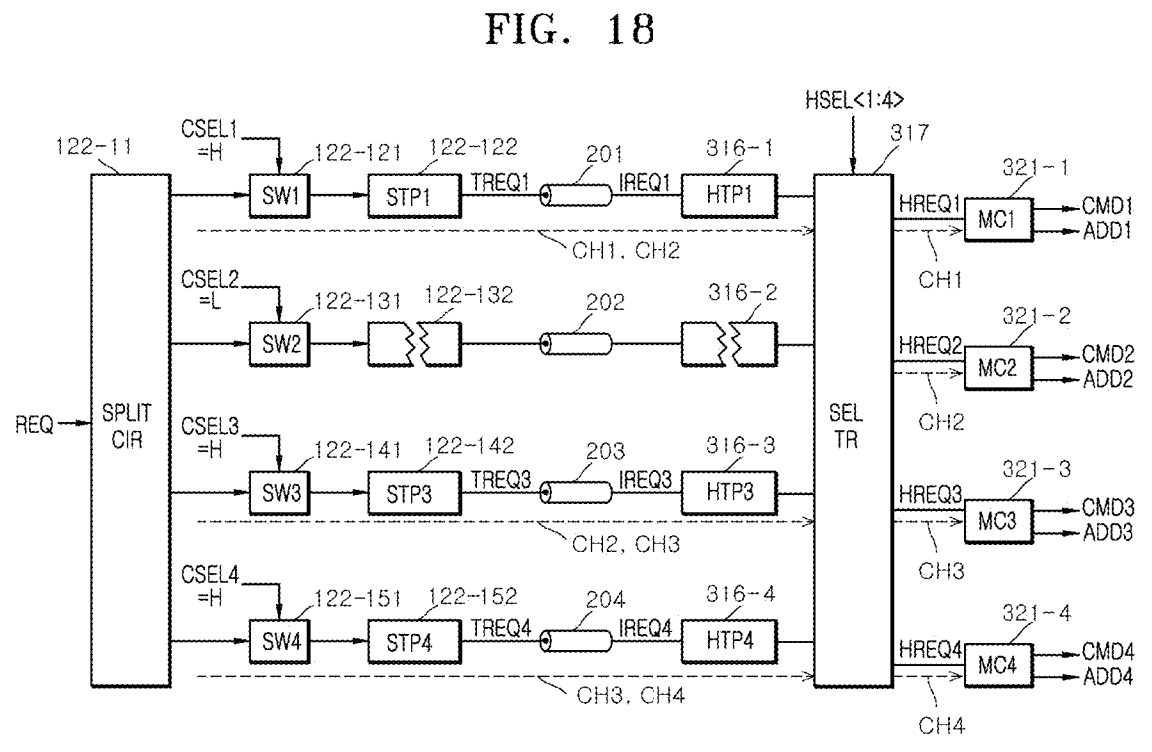

An operation including transmitting the requests REQ to the channels 412 to 415 according to an embodiment of the present disclosure is described with reference to FIG. 18. An example in which a fail occurs in the second system interface 122-132 and the second HBM interface 316-2 is described.

The requests REQ transmitted to the channels 412 to 415 are generated at the same time and include a plurality of bits. The requests REQ transmitted to the channels 412 to 415 may be generated at different times. For example, the request REQ transmitted to the second channel 413 is generated after generating the request REQ transmitted to the first channel 412.

The split circuit 122-11 outputs, to the first transfer request generation circuit 122-12, the request REQ to be transmitted to the first channel CH1 412 included in the first core chip 410 from among the requests REQ. The split circuit 122-11 outputs, to the third transfer request generation circuit 122-14, the request REQ to be transmitted to the third channel CH3 414 included in the first core chip 410 from among the requests REQ. The split circuit 122-11 outputs, to the fourth transfer request generation circuit 122-15, the request REQ to be transmitted to the fourth channel CH4 415 included in the first core chip 410 from among the requests REQ. When a fail occurs in the second system interface 122-132 and the second memory interface 314-21 associated with the second channel CH2 413, the split circuit 122-11 splits the requests REQ and outputs, to the first transfer request generation circuit 122-12, the third transfer request generation circuit 122-14, and the fourth transfer request generation circuit 122-15, the request REQ to be transmitted to the second channel CH2 413 included in the first core chip 410.

The first switch 122-121 of the first transfer request generation circuit 122-12 is turned on when the first channel selection signal CSEL<1> is enabled at a logic high level and receives the requests REQ. The first system interface 122-122 of the first transfer request generation circuit 122-12 outputs, as the first transfer request TREQ1, the request REQ received when the first channel selection signal CSEL<1> is enabled at a logic high level. In this example, the request REQ output as the first transfer request TREQ1 includes a command and an address that control operation of the first channel 412 of the first core chip 410. The request REQ output as the first transfer request TREQ1 includes a command and an address that control operation of the second channel 413 of the first core chip 410.

The second switch 122-131 of the second transfer request generation circuit 122-13 is turned off when the second channel selection signal CSEL<2> is disabled at a logic low level.

The third switch 121-141 of the third transfer request generation circuit 122-14 is turned on when the third channel selection signal CSEL<3> is enabled at a logic high level, and receives the requests REQ. The third system interface 122-142 of the third transfer request generation circuit 122-14 outputs, as the third transfer request TREQ3, the request REQ received when the third channel selection signal CSEL<3> is enabled at a logic high level. In this example, the request REQ output as the third transfer request TREQ3 includes a command and an address that control operation of the third channel 414 of the first core chip 410. The request REQ output as the third transfer request TREQ3 includes a command and an address that control operation of the second channel 413 of the first core chip 410.

The fourth switch 122-151 of the fourth transfer request generation circuit 122-15 is turned on when the fourth channel selection signal CSEL<4> is enabled at a logic high level and receives the requests REQ. The fourth system interface 122-152 of the fourth transfer request generation circuit 122-15 outputs, as the fourth transfer request TREQ4, the requests REQ received when the fourth channel selection signal CSEL<4> is enabled at a logic high level. In this example, the request REQ output as the fourth transfer request TREQ4 includes a command and an address that control operation of the fourth channel 415 of the first core chip 410. The request REQ output as the fourth transfer request TREQ4 includes a command and an address that control operation of the third channel 414 of the first core chip 410.

The interposer 200 outputs the first transfer request TREQ1 as the first input request IREQ1 through the first wire 201.

The interposer 200 outputs the third transfer request TREQ3 as the third input request IREQ3 through the third wire 203.

The interposer 200 outputs the fourth transfer request TREQ4 as the fourth input request IREQ4 through the fourth wire 204.

The first HBM interface 316-1 receives and outputs the first input request IREQ1.

The third HBM interface 316-3 receives and outputs the third input request IREQ3.

The fourth HBM interface 316-4 receives and outputs the fourth input request IREQ4.

When the first memory selection signal HSEL<1> is enabled, the selection transfer circuit 317 outputs, as the first memory request HREQ1, an input request to be transmitted to the first channel CH1 412 included in the first core chip 410 from among the first input request IREQ1, the third input request IREQ3, and the fourth input request IREQ4 received from the first HBM interface 316-1, the third HBM interface 316-3, and the fourth HBM interface 316-4, respectively.

When the second memory selection signal HSEL<2> is enabled, the selection transfer circuit 317 outputs, as the second memory request HREQ2, an input request to be transmitted to the second channel CH2 413 included in the first core chip 410 from among the first input request IREQ1, the third input request IREQ3, and the fourth input request IREQ4 received from the first HBM interface 316-1, the third HBM interface 316-3, and the fourth HBM interface 316-4, respectively.

When the third memory selection signal HSEL<3> is enabled, the selection transfer circuit 317 outputs, as the third memory request HREQ3, an input request to be transmitted to the third channel CH3 414 included in the first core chip 410 from among the first input request IREQ1, the third input request IREQ3, and the fourth input request IREQ4 received from the first HBM interface 316-1, the third HBM interface 316-3, and the fourth HBM interface 316-4, respectively.

When the fourth memory selection signal HSEL<4> is enabled, the selection transfer circuit 317 outputs, as the fourth memory request HREQ4, an input request to be transmitted to the fourth channel CH4 415 included in the first core chip 410 from among the first input request IREQ1, the third input request IREQ3, and the fourth input request IREQ4 received from the first HBM interface 316-1, the third HBM interface 316-3, and the fourth HBM interface 316-4, respectively.

The first memory controller 321-1 generates the first command CMD1 and the first address ADD1 based on a command and an address included in the first memory request HREQ1 to be transmitted to the first channel CH1 412 included in the first core chip 410. The first command CMD1 and the first address ADD1 are output to the first channel CH1 412 included in the first core chip 410 through the TSV interface circuit 330.

The second memory controller 321-2 generates the second command CMD2 and the second address ADD2 based on a command and an address included in the second memory request HREQ2 to be transmitted to the second channel CH2 413 included in the first core chip 410. The second command CMD2 and the second address ADD2 are output to the second channel CH2 413 included in the first core chip 410 through the TSV interface circuit 330.

The third memory controller 321-3 generates the third command CMD3 and the third address ADD3 based on a command and an address included in the third memory request HREQ3 to be transmitted to the third channel CH3 414 included in the first core chip 410. The third command CMD3 and the third address ADD3 are output to the third channel CH3 414 included in the first core chip 410 through the TSV interface circuit 330.

The fourth memory controller 321-4 generates the fourth command CMD4 and the fourth address ADD4 based on a command and an address included in the fourth memory request HREQ4 to be transmitted to the fourth channel CH4 415 included in the first core chip 410. The fourth command CMD4 and the fourth address ADD4 are output to the fourth channel CH4 415 included in the first core chip 410 through the TSV interface circuit 330.

The semiconductor system 1, according to an embodiment of the present disclosure, splits the requests REQ, transmits the requests REQ that control operation of the stack memory device 400 to the stack memory device 400 by bypassing an interface in which a fail occurred. The semiconductor system 1 can prevent errors during operation of the stack memory device 400 by splitting the requests REQ, bypassing an interface in which a fail occurred, and transmitting the split requests REQ to the stack memory device 400. The semiconductor system 1 can prevent defective or faulty processing of the stack memory device 400 by bypassing an interface in which a fail occurred and transmitting the split requests REQ to the stack memory device 400.

Figure 19:
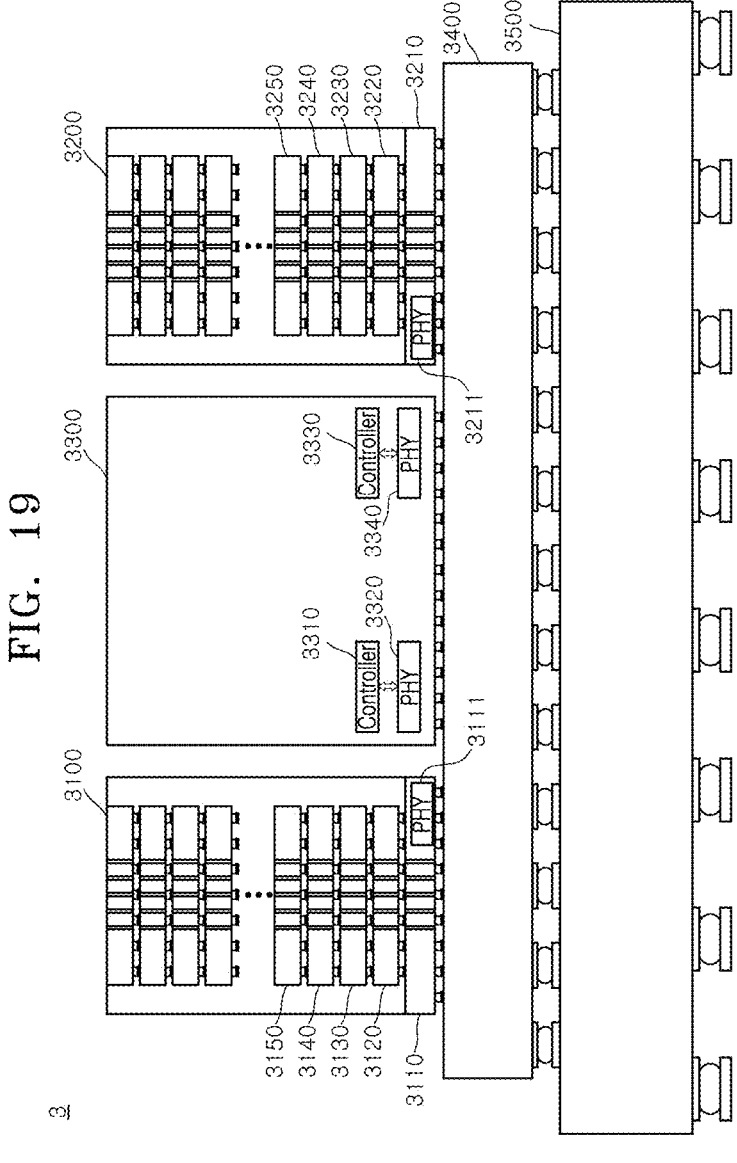
FIG. 19 and FIG. 20 are diagrams illustrating an embodiment of a stack memory system according to the present disclosure.

FIG. 19 is a block diagram illustrating a stack memory system 3 according to an embodiment of the present disclosure. As illustrated in FIG. 19, the stack memory system 3 includes a first stack memory device 3100, a second stack memory device 3200, a processor 3300, an interposer 3400, and a substrate 3500. The stack memory system 3 includes interface bypassing for failed interfaces and optionally request splitting, such as described with respect to FIG. 1 through FIG. 18.

The interposer 3400 is formed on or over the substrate 3500. The first stack memory device 3100, the second stack memory device 3200, and the processor 3300 are formed on or over the interposer 3400. The processor 3300 is disposed between the first stack memory device 3100 and the second stack memory device 3200 in this example. The interposer 3400 electrically connects the substrate 3500, the first stack memory device 3100, the second stack memory device 3200, and the processor 3300. Because the pitch difference between the first stack memory device 3100, the second stack memory device 3200, and the processor 3300 may be large, the first stack memory device 3100, the second stack memory device 3200, and the processor 3300 are electrically connected, for example, utilizing conductive lines that are variously formed. The interposer 3400 may be implemented with the interposer 200 illustrated in FIG. 1.

The processor 3300 includes a first controller 3310 that controls the first stack memory device 3100 and a first process interface circuit PHY 3320 that electrically connects the first stack memory device 3100 and the first controller 3310. The processor 3300 includes a second controller 3330 that controls the second stack memory device 3200 and a second process interface circuit (PHY) 3340 that electrically connects the second stack memory device 3200 and the second controller 3330. The processor 3300 conveys, to the first stack memory device 3100 through the first process interface circuit 3320, signals including a command and an address that control various internal operations of the first stack memory device 3100 and receives signals from the first stack memory device 3100 through the first process interface circuit 3320. The processor 3300 conveys, to the second stack memory device 3200 through the second process interface circuit 3340, signals including a command and an address that control various internal operations of the second stack memory device 3200 and receives signals from the second stack memory device 3200 through the second process interface circuit 3340. The processor 3300 may be implemented with the processor 110 illustrated in FIG. 1. The first controller 3310 and the second controller 3330 may be implemented with the memory controller 320 illustrated in FIG. 1. The first process interface circuit 3320 and the second process interface circuit 3340 may be implemented with the system interface circuit 120 illustrated in FIG. 1.

The first stack memory device 3100 includes a first base chip 3110 and first core chips 3120, 3130, 3140, and 3150. The first stack memory device 3100 may be implemented with the stack memory device 400 illustrated in FIG. 1. The first core chips 3120, 3130, 3140, and 3150 are sequentially stacked on or over the first base chip 3110 and receive various signals from the first base chip 3110 through TSVs. The first stack memory device 3100 is formed to include the four first core chips 3120, 3130, 3140, and 3150, but may be formed by stacking quantities of core chips, such as 4, 8, 16, or other quantities. The first stack memory device 3100 may be implemented with the stack memory device 400 illustrated in FIG. 1.

The first base chip 3110 includes a first core interface circuit PHY 3111. The first core interface circuit 3111 is configured to communicate with the first process interface circuit 3320 and receives signals from the processor 3300 and conveys, to the processor 3300, signals generated by the first core chips 3120, 3130, 3140, and 3150. The first core interface circuit 3111 may be implemented with the HBM interface circuit 310 illustrated in FIG. 1.

The second stack memory device 3200 includes a second base chip 3210 and second core chips 3220, 3230, 3240, and 3250. The second stack memory device 3200 may be implemented with the stack memory device 400 illustrated in FIG. 1. The second core chips 3220, 3230, 3240, and 3250 are sequentially stacked on or over the second base chip 3210 and receive various signals from the second base chip 3210 through TSVs. The second stack memory device 3200 is formed to include the four second core chips 3220, 3230, 3240, and 3250, but may be formed by stacking various quantities of core chips, such as 4, 8, 16, or other quantities. The second stack memory device 3200 may be implemented with the stack memory device 400 illustrated in FIG. 1.

The second base chip 3210 includes a second core interface circuit PHY 3211. The second core interface circuit 3211 is configured to communicate with the second process interface circuit 3340 and receives signals from the processor 3300 and conveys, to the processor 3300, signals generated by the second core chips 3220, 3230, 3240, and 3250. The second core interface circuit 3211 may be implemented with the HBM interface circuit 310 illustrated in FIG. 1.

Figure 20:
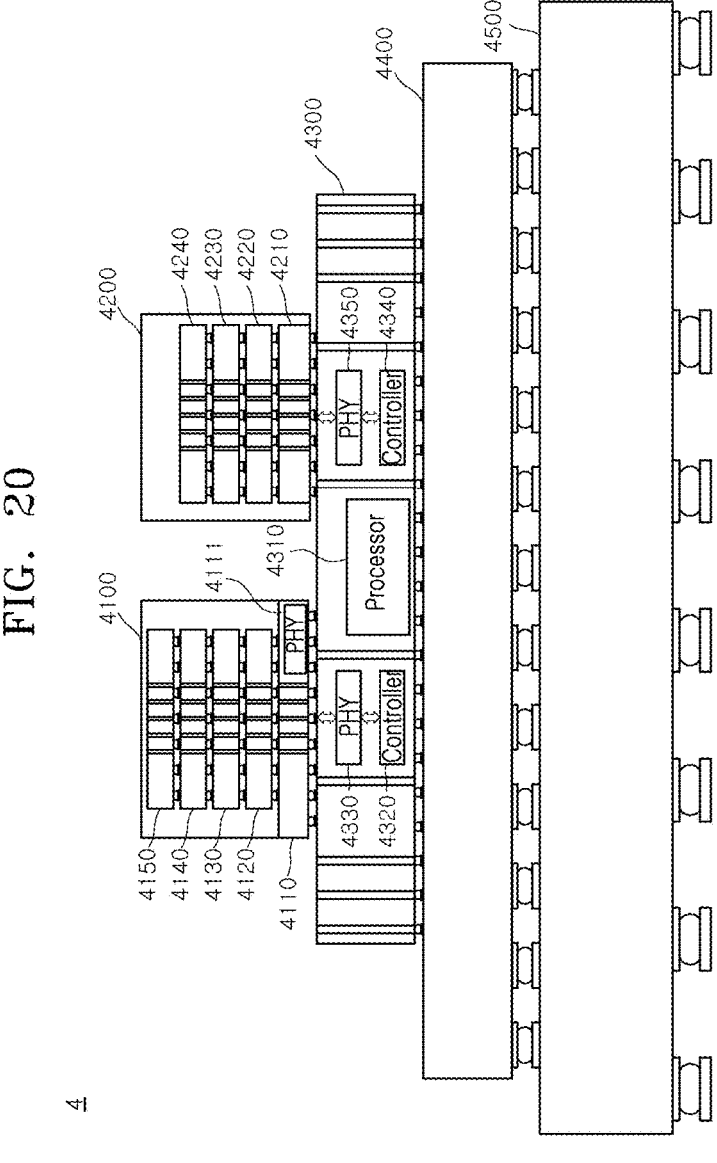

FIG. 20 is a block diagram illustrating a construction of a stack memory system 4 according to an embodiment of the present disclosure. As illustrated in FIG. 20, the stack memory system 4 includes a first stack memory device 4100, a second stack memory device 4200, a system control device 4300, a substrate 4400, and a main board 4500. The stack memory system 3 includes interface bypassing for failed interfaces and optionally request splitting, such as described with respect to FIG. 1 through FIG. 18.

The substrate 4400 is formed on or over the main board 4500. The system control device 4300 is formed on or over the substrate 4400. The first stack memory device 4100 and the second stack memory device 4200 are formed on or over the system control device 4300. The system control device 4300 includes a processor 4310, a first controller 4320, a first process interface circuit PHY 4330, a second controller 4340, and a second process interface circuit PHY 4350.

The processor 4310 is electrically connected to the first controller 4320 to control various internal operations of the first stack memory device 4100. The processor 4310 conveys, to the first stack memory device 4100 through the first process interface circuit 4330, signals including a command and an address that control various internal operations of the first stack memory device 4100 and receives signals from the first stack memory device 4100 through the first process interface circuit 4330. The processor 4310 is electrically connected to the second controller 4340 to control various internal operations of the second stack memory device 4200. The processor 4310 conveys, to the second stack memory device 4200 through the second process interface circuit 4350, signals including a command and an address that control various internal operations of the second stack memory device 4100 and receives signals from the second stack memory device 4200 through the second process interface circuit 4350. The processor 4310 may be implemented with the processor 110 illustrated in FIG. 1. The first controller 4320 and the second controller 4340 may each be implemented with the memory controller 320 illustrated in FIG. 1. The first process interface circuit 4330 and the second process interface circuit 4350 may be implemented with the system interface circuit 120 illustrated in FIG. 1.

The first stack memory device 4100 includes a first base chip 4110 and first core chips 4120, 4130, 4140, and 4150. The first stack memory device 4100 may be implemented with the stack memory device 400 illustrated in FIG. 1. The first core chips 4120, 4130, 4140, and 4150 are sequentially stacked on or over the first base chip 4110 and receive various signals from the first base chip 4110 through TSVs. The first stack memory device 4100 is formed to include the four first core chips 4120, 4130, 4140, and 4150, but may be formed by stacking various quantities of core chips, such as 4, 8, 16, or other quantities. The first stack memory device 4100 may be implemented with the stack memory device 400 illustrated in FIG. 1.

The first base chip 4110 includes a first core interface circuit PHY 4111. The first core interface circuit 4111 is configured to communicate with the first process interface circuit 4330 and receives a signal from the processor 4310 and conveys, to the processor 4310, signals generated by the first core chips 4120, 4130, 4140, and 4150. The first core interface circuit 4111 may be implemented with the HBM interface circuit 310 illustrated in FIG. 1.

The second stack memory device 4200 includes second core chips 4210, 4220, 4230, and 4240. The second stack memory device 4200 may be implemented with the stack memory device 400 illustrated in FIG. 1. The second core chips 4210, 4220, 4230, and 4240 are sequentially stacked and receive various signals through TSVs. The second stack memory device 4200 is formed to include the four second core chips 4210, 4220, 4230, and 4240, but may be formed by stacking various quantities of core chips, such as 4, 8, 16, or other quantities. The second stack memory device 3200 may be implemented with the stack memory device 400 illustrated in FIG. 1.

The second stack memory device 4200 is configured to communicate with the second process interface circuit 4350 and receives signals from the processor 4310 and conveys, to the processor 4310, signals generated by the second core chips 4210, 4220, 4230, and 4240.

Although the detailed embodiments are described in the present disclosure, those skilled in the art will understand that various modifications, additions, and substitutions related to these embodiments are possible without departing from the scope and technical concepts of the present disclosure. Therefore, the scope of the present disclosure should not be limited to the foregoing embodiments. All changes within the meaning and range of equivalency of the claims are included within their scope.

What is claimed is:

1. A semiconductor system comprising:
   a system chip comprising a plurality of system interfaces, configured to output a plurality of requests as a plurality of transfer requests through the plurality of system interfaces, and configured to output the plurality of requests as the plurality of transfer requests by bypassing a system interface in which a fail occurred among the plurality of system interfaces;
   an interposer comprising a plurality of wires and configured to output the plurality of transfer requests as a plurality of input requests through the plurality of wires; and
   a base chip comprising a plurality of high bandwidth memory (HBM) interfaces and configured to control operation of a stack memory device in response to receiving the plurality of input requests from the plurality of HBM interfaces and configured to receive the plurality of input requests by bypassing an HBM interface in which a fail occurred among the plurality of HBM interfaces.

2. The semiconductor system of claim 1, wherein the system chip is configured to output the plurality of requests as the plurality of transfer requests through a HBM interface adjacent to the HBM interface in which a fail occurred among the plurality of HBM interfaces.

3. The semiconductor system of claim 1, wherein the base chip is configured to receive the plurality of input requests through an HBM interface adjacent to the HBM interface in which a fail occurred among the plurality of HBM interfaces.

4. The semiconductor system of claim 1, wherein the system chip comprises:
   a processor configured to generate the plurality of requests that controls operation of the stack memory device based on an external signal and configured to generate a plurality of channel selection signals that control an input of the system interface in which a fail occurred among the plurality of system interfaces based on a fail information signal; and
   a system interface circuit configured to, based on the plurality of channel selection signals, block the input of the system interface in which a fail occurred among the plurality of system interfaces and configured to output the plurality of requests as the plurality of transfer requests through the plurality of system interfaces.

5. The semiconductor system of claim 1, wherein the base chip comprises:
   an HBM interface configured to, based on the plurality of input requests, block an input of the HBM interface in which a fail occurred among the plurality of HBM interfaces and configured to generate a plurality of memory requests in response to receiving the plurality of input requests from the plurality of HBM interfaces; and
   a plurality of memory controllers configured to control operation of the stack memory device based on the plurality of memory requests.

6. The semiconductor system of claim 5, wherein an HBM interface of the plurality of HBM interfaces comprises:
   a memory selection signal generation circuit configured to generate, based on the plurality of input requests, a plurality of memory selection signals that controls the input of the HBM interface in which a fail occurred among the plurality of HBM interfaces; and
   a memory request generation circuit configured to, based on the plurality of memory selection signals, block the input of the HBM interface in which a fail occurred among the plurality of HBM interfaces and configured to output the plurality of input requests as the plurality of memory requests through the plurality of HBM interfaces.

7. The semiconductor system of claim 6,
wherein the plurality of memory controllers is configured to generate a plurality of commands and a plurality of addresses that control the stack memory device based on the plurality of memory requests; and
wherein the plurality of commands and the plurality of addresses are output to the stack memory device through a plurality of through electrodes.

8. A semiconductor system comprising:
a system chip comprising a first system interface, a second system interface, a third system interface, and a fourth system interface and configured to output, when a fail occurs in the fourth system interface, a first request, a second request, a third request, and a fourth request as a first transfer request, a second transfer request, a third transfer request, and a fourth transfer request through the first system interface, the second system interface, and the third system interface, wherein the first system interface and the second system interface are adjacent to the fourth system interface;
an interposer comprising a plurality of wires and configured to output the first transfer request, the second transfer request, the third transfer request, and the fourth transfer request as a first input request, a second input request, a third input request, and a fourth input request through the plurality of wires; and
a base chip comprising a first high bandwidth memory (HBM) interface, a second HBM interface, a third HBM interface, and a fourth HBM interface and configured to receive, when a fail occurs in the fourth HBM interface, the first input request, the second input request, the third input request, and the fourth input request from the first HBM interface, the second HBM interface, and the third HBM interface, wherein the first HBM interface and the second HBM interface are adjacent to the fourth HBM interface.

9. The semiconductor system of claim 8, wherein the system chip is configured to, when a fail occurs in the second system interface, split the second chip, output the first request as the first transfer request through the first system interface, output the third request as the third transfer request through the third system interface, output the fourth request as the fourth transfer request through the fourth system interface, and output the second request as the first transfer request and the third transfer request through the first system interface and the third system interface.

10. The semiconductor system of claim 9, wherein the system chip is configured to, when a fail occurs in the second system interface, output the second request as the first transfer request after outputting the first request as the first transfer request through the first system interface and output the second request as the third transfer request after outputting the third request as the third transfer request through the third system interface.

11. The semiconductor system of claim 8, wherein the system chip is configured to, when a fail occurs in the third system interface, split the third request, output the first request as the first transfer request through the first system interface, output the second request as the second transfer request through the second system interface, output the fourth request as the fourth transfer request through the fourth system interface, and output the third request as the second transfer request and the fourth transfer request through the second system interface and the fourth system interface.

12. The semiconductor system of claim 11, wherein the system chip is configured to, when a fail occurs in the third system interface, output, through the second system interface, the third request as the second transfer request after outputting the second request as the second transfer request and output, through the fourth system interface, the third request as the fourth transfer request after outputting the fourth request as the fourth transfer request.

13. The semiconductor system of claim 8, wherein the base chip is configured to, when a fail occurs in the second HBM interface, receive the first input request generated from the first request through the first HBM interface, receive the third input request generated from the third request through the third HBM interface, receive the fourth input request generated from the fourth request through the fourth HBM interface, receive the first input request generated from the second request through the first HBM interface, and receive the third input request generated from the second request through the third HBM interface.

14. The semiconductor system of claim 8, wherein the base chip is configured to, when a fail occurs in the third HBM interface, receive the first input request generated from the first request through the first HBM interface, receive the second input request generated from the second request through the second HBM interface, receive the fourth input request generated from the fourth request through the fourth HBM interface, receive the second input request generated from the third request through the second HBM interface, and receive the fourth input request generated from the third request through the fourth HBM interface.

15. The semiconductor system of claim 8, wherein the system chip comprises:
a processor configured to generate the first request, the second request, the third request, and the fourth request that control operation of a stack memory device based on an external signal and configured to generate a first channel selection signal, a second channel selection signal, a third channel selection signal, and a fourth channel selection signal that control an input of the system interface in which a fail occurred among the first system interface, the second system interface, the third system interface, and the fourth system interface based on a fail information signal; and
a system interface circuit configured to block the input of the system interface in which a fail occurred among the first system interface, the second system interface, the third system interface, and the fourth system interface based on the first channel selection signal, the second channel selection signal, the third channel selection signal, and the fourth channel selection signal, configured to split the first to fourth requests, and configured to output the split first request, the second request, the third request, and the fourth request as the first transfer request, the second transfer request, the third transfer request, and the fourth transfer request through the first system interface, the second system interface, the third system interface, and the fourth system interface.

16. The semiconductor system of claim 15, wherein the system interface circuit comprises:
a split circuit configured to split the first request, the second request, the third request, and the fourth request and output a first split request, a second split request, a third split request, and a fourth split request;

a first transfer request generation circuit configured to output the split first request as the first transfer request based on the first channel selection signal;

a second transfer request generation circuit configured to output the split second request as the second transfer request based on the second channel selection signal;

a third transfer request generation circuit configured to output the split third request as the third transfer request based on the third channel selection signal; and a fourth transfer request generation circuit configured to output the split fourth request as the fourth transfer request based on the fourth channel selection signal.

17. The semiconductor system of claim 8, wherein the base chip comprises:

an HBM interface configured to block an input of the HBM interface in which a fail occurred, among the first to fourth HBM interfaces, based on the first input request, the second input request, the third input request, and the fourth input request and configured to generate a plurality of memory requests in response to receiving the first input request, the second input request, the third input request, and the fourth input request from the first HBM interface, the second HBM interface, the third HBM interface, and the fourth HBM interface; and a memory controller configured to control an operation of a stack memory device based on the plurality of memory requests.

18. The semiconductor system of claim 17, wherein the HBM interface comprises:

a memory selection signal generation circuit configured to generate a plurality of memory selection signals that controls the input of the HBM interface in which a fail occurred among the first HBM interface, the second HBM interface, the third HBM interface, and the fourth HBM interface based on the first input request, the second input request, the third input request, and the fourth input requests; and a memory request generation circuit configured to block input of the HBM interface in which a fail occurred among the first HBM interface, the second HBM interface, the third HBM interface, and the fourth HBM interface based on the plurality of memory selection signals and configured to output the first input request, the second input request, the third input request, and the fourth input requests as the plurality of memory requests through the first HBM interface, the second HBM interface, the third HBM interface, and the fourth HBM interface.

19. The semiconductor system of claim 17, wherein the memory controller is configured to generate a plurality of commands and a plurality of addresses that control the stack memory device based on the plurality of memory requests; and wherein the plurality of commands and the plurality of addresses are output to the stack memory device through a plurality of through electrodes.

20. A semiconductor system comprising:

a system chip comprising a first system interface, a second system interface, a third system interface, and a fourth system interface and configured to output a first request, a second request, a third request, and a fourth request as a first transfer request, a second transfer request, a third transfer request, and a fourth transfer request through the first system interface, the second system interface, the third system interface, and the fourth system interface, configured to split the first request, the second request, the third request, and the fourth request through a system interface in which a fail has not occurred by bypassing a system interface in which a fail occurred among the first system interface, the second system interface, the third system interface, and the fourth system interface, and configured to output a split first request, a split second request, a split third request, and a split fourth request as the first transfer request, the second transfer request, the third transfer request, and the fourth transfer request;

an interposer comprising a plurality of wires and configured to output the first transfer request, the second transfer request, the third transfer request, and the fourth transfer request as a first input request, a second input request, a third input request, and a fourth input request through the plurality of wires; and a base chip comprising a first high bandwidth memory (HBM) interface, a second HBM interface, a third HBM interface, and a fourth HBM interface and configured to receive the first input request, the second input request, the third input request, and the fourth input request from the first HBM interface, the second HBM interface, the third HBM interface, and the fourth HBM interface, configured to receive the first input request, the second input request, the third input request, and the fourth input request from an HBM interface in which a fail has not occurred by bypassing an HBM interface in which a fail occurred among the first HBM interface, the second HBM interface, the third HBM interface, and the fourth HBM interface, and configured to transmit the first input request, the second input request, the third input request, and the fourth input request to a plurality of channels of a stack memory device by splitting the first input request, the second input request, the third input request, and the fourth input request.

21. The semiconductor system of claim 20, wherein the system chip is configured to, when a fail occurs in the second system interface, split the first request, the second request, the third request, and the fourth request and output the first request, the second request, the third request, and the fourth requests as the first transfer request, the second transfer request, the third transfer request, and the fourth transfer request through the first system interface, the third system interface, and the fourth system interface.

22. The semiconductor system of claim 20, wherein the system chip is configured to, when a fail occurs in the third system interface, split the first request, the second request, the third request, and the fourth request and output the first request, the second request, the third request, and the fourth requests as the first transfer request, the second transfer request, the third transfer request, and the fourth transfer request through the first system interface, the second system interface, and the fourth system interface by.

23. The semiconductor system of claim 20, wherein the base chip is configured to, when a fail occurs in the second HBM interface, split the first input request, the second input request, the third input request, and the fourth input request and output the first input request, the second input request, the third input request, and the fourth input request received from the first HBM interface, the third HBM interface, and the fourth HBM interface to a plurality of memory controllers that control the plurality of channels.

24. The semiconductor system of claim 20, wherein the base chip is configured to, when a fail occurs in the third HBM interface, split the first input request, the second input request, the third input request, and the fourth input request and output the first input request, the second input request, the third input request, and the fourth input request received from the first HBM interface, the second HBM interface, and the fourth HBM interface to a plurality of memory controllers that controls the plurality of channels.

25. The semiconductor system of claim 20, wherein the system chip comprises:

a processor configured to generate the first request, the second request, the third request, and the fourth request that control an operation of the stack memory device based on an external signal and configured to, based on a fail information signal, generate a first channel selection signal, a second channel selection signal, a third channel selection signal, and a fourth channel selection signal that control an input of the system interface in which a fail occurred among the first system interface, the second system interface, the third system interface, and the fourth system interface; and a system interface circuit configured to block input of the system interface in which a fail occurred among the first system interface, the second system interface, the third system interface, and the fourth system interface, based on the first channel selection signal, the second channel selection signal, the third channel selection signal, and the fourth channel selection signal, configured to split the first request, the second request, the third request, and the fourth request, and configured to output the split first request, the split second request, the split third request, and the split fourth request as the first transfer request, the second transfer request, the third transfer request, and the fourth transfer request through the first system interface, the second system interface, the third system interface, and the fourth system interface.

26. The semiconductor system of claim 25, wherein the system interface circuit comprises:

a split circuit configured to split and output the first request, the second request, the third request, and the fourth request;

a first transfer request generation circuit configured to output the split first request as the first transfer request based on the first channel selection signal;

a second transfer request generation circuit configured to output the split second request as the second transfer request based on the second channel selection signal;

a third transfer request generation circuit configured to output the split third request as the third transfer request based on the third channel selection signal; and a fourth transfer request generation circuit configured to output the split fourth request as the fourth transfer request based on the fourth channel selection signal.

27. The semiconductor system of claim 20, wherein the base chip comprises:

an HBM interface circuit configured to block input of an HBM interface in which a fail occurred among the first HBM interface, the second HBM interface, the third HBM interface, and the fourth HBM interfaces based on the first input request, the second input request, the third input request, and the fourth input request, configured to receive the first input request, the second input request, the third input request, and the fourth input request through the first HBM interface, the second HBM interface, the third HBM interface, and the fourth HBM interface, and configured to generate a plurality of memory requests by splitting the first input request, the second input request, the third input request, and the fourth input requests; and a plurality of memory controllers configured to control the stack memory device by transmitting the plurality of memory requests to the plurality of channels of the stack memory device.

* * * * *